(12) United States Patent
Takahashi et al.

(10) Patent No.: US 8,350,899 B2
(45) Date of Patent: Jan. 8, 2013

(54) STEREOSCOPIC DISPLAY DEVICE

(75) Inventors: Kenichi Takahashi, Kanagawa (JP); Sho Sakamoto, Tokyo (JP); Takashi Oku, Kanagawa (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 12/716,642

(22) Filed: Mar. 3, 2010

(65) Prior Publication Data

US 2010/0238277 A1    Sep. 23, 2010

(30) Foreign Application Priority Data

Mar. 11, 2009    (JP) ................................. P2009-058132

(51) Int. Cl.
*H04N 13/04*    (2006.01)
*G09G 5/00*    (2006.01)

(52) U.S. Cl. ............................................. 348/59; 345/6
(58) Field of Classification Search .................... 348/59, 348/51, 222.1, 58, 42, 40, 49, 54, 88, 44; 353/7, 8; 345/6
See application file for complete search history.

(56) References Cited

U.S. PATENT DOCUMENTS

| 6,072,566 | A  | * | 6/2000 | Fujii et al. ........................ 356/15 |
| 6,556,266 | B1 | * | 4/2003 | Shirochi et al. ............... 349/118 |
| 2007/0069978 | A1 | * | 3/2007 | Daiku .............................. 345/8 |
| 2008/0211736 | A1 | * | 9/2008 | Taira et al. ........................ 345/6 |
| 2009/0015918 | A1 | * | 1/2009 | Morozumi et al. ........... 359/463 |

FOREIGN PATENT DOCUMENTS

JP    2008 9370    1/2008

* cited by examiner

*Primary Examiner* — Behrooz Senfi
(74) *Attorney, Agent, or Firm* — Frommer Lawrence & Haug LLP; William S. Frommer

(57) ABSTRACT

A stereoscopic display device includes: a display panel having a display screen on which two-dimensional image is displayed, and configured to polarize image light of the image-displaying into a particular polarization direction; and a lens array element disposed to oppose the display screen of the display panel, and having a liquid crystal layer which includes liquid crystal molecules having a refractive index anisotropy and aligned in a predetermined orientation direction under no application of voltage. The lens array element is configured to electrically change the alignment of the liquid crystal molecules to generate a lens effect, and configured to selectively change a state of passing therethrough of the image light exiting from the display panel. The predetermined orientation direction of the liquid crystal molecules of the lens array element and the polarization direction of the image light are parallel to each other.

8 Claims, 16 Drawing Sheets

VOLTAGE OFF

VOLTAGE ON

VOLTAGE OFF

VOLTAGE ON

STEREOSCOPIC DISPLAY DEVICE

BACKGROUND OF THE INVENTION

1. Field of the Invention

The present invention relates to a stereoscopic display device capable of electrically switching over between two-dimensional displaying and three-dimensional displaying by using a variable lens-array element utilizing a liquid crystal lens.

2. Description of Related Art

There has been known a binocular stereoscopic display device or a multi-eye stereoscopic display device, which realizes a stereoscopic vision by presenting parallax images, having parallax, to both eyes of an observer, respectively. There is also a spatial-image stereoscopic display device, which realizes more natural stereoscopic vision. The spatial-image stereoscopic display device radiates a plurality of light rays having different radiation directions into a space, to form a spatial image corresponding to a plurality of viewing angles.

As a way of realizing such stereoscopic display devices, there has been known a stereoscopic display device, which combines a two-dimensional display device such as a liquid crystal display with an optical device used for a three-dimensional displaying, for example. This optical device for the three-dimensional displaying application deflects display-image light emitted from the two-dimensional display device into a plurality of viewing-angle directions. As illustrated in FIG. 19, a cylindrical lens array 302, in which a plurality of cylindrical lenses (cylinder lenses) 303 are arranged in parallel, is utilized for example for the optical device. The cylindrical lens array 302 is disposed to oppose a display screen of a display panel 301 which includes the two-dimensional display device. Each of the cylindrical lenses 303 is so disposed as to extend vertically (or a "vertical direction") relative to the display screen of the display panel 301, and to have refractive power in left and right directions (or a "horizontal direction"). The display screen of the display panel 301 includes a plurality of display pixels, which are aligned two-dimensionally in a regular manner. A back face of each of the cylindrical lenses 303 is arranged with two or more pixels. The stereoscopic vision is possible by causing light rays from the respective pixels to exit in different horizontal directions with the use of the refractive power of the lenses, so as to satisfy binocular parallax.

FIG. 19 illustrates an example of binocular stereoscopic displaying, where two adjacent pixel rows 301R and 301L in the display screen of the display panel 301 are allocated to each of the cylindrical lenses 303. The pixel row 301R as one row of pixels displays a right parallax image, whereas the pixel row 301L as the other row of pixels displays a left parallax image. The parallax images displayed by the pixel rows 301R and 301L are separated and distributed for discrete left and right optical paths 402 and 403 by the respective cylindrical lenses 303, respectively. Thus, when an observer 400 sees the stereoscopic device from a predetermined direction at a predetermined position, the left and the right parallax images properly reach left and right eyes 401L and 401R of the observer 400, and a stereoscopic image is thereby recognized by the observer 400.

Similarly, in an example of multi-eye stereoscopic displaying, a plurality of parallax images, which are taken from directions at positions corresponding to three or more viewpoints, are equally allocated to one lens-pitch of the cylindrical lenses 303 (more specifically, each lens-pitch of the cylindrical lens 303 in the horizontal direction), so as to be allocated for different optical paths and to be displayed stereoscopically. Thus, three or more parallax images are caused to exit for different but continuous angular ranges by the cylindrical lens array 302, and are imaged on the left and the right eyes 401L and 401R of the observer 400. In this example, the plurality of different parallax images are recognized by the observer 400 according to changes in position and direction of the viewpoint of the observer 400. The more realistic stereoscopic effect is obtainable when there are more changes in the parallax images corresponding to the changes in the viewpoint.

The cylindrical lens array 302 in the examples described above may be a lens array configured, for example, of a molded resin having a fixed shape and a fixed lens effect. However, a display device utilizing the cylindrical lens array 302 in this case is useable only for three-dimensional displaying due to the fixed lens effect. On the other hand, a switching lens-array element utilizing liquid crystal lenses may be used for the cylindrical lens array 302. The use of the switching lens-array element utilizing the liquid crystal lenses makes it possible to electrically switch over between presence and absence of the lens effect. Thus, modes of displaying are switchable between two displaying modes of a two-dimensional displaying mode and a three-dimensional displaying mode, by a combination with the two-dimensional displaying device. More specifically, in the two-dimensional displaying mode, the lens array is caused to have a state in which no lens effect is present (i.e., a state where no refractive power is present), so as to allow display-image light emitted from the two-dimensional displaying device to pass therethrough as it is. In the three-dimensional displaying mode, the lens array is caused to have a state in which the lens effect is generated to deflect the display-image light exiting from the two-dimensional displaying device into the plurality of viewing-angle directions, so as to thereby realize the stereoscopic vision.

FIG. 20A to FIG. 22 illustrate respectively an example of a configuration of the switching lens array element utilizing the liquid crystal lens. As illustrated in FIGS. 20A and 20B, the lens array element is provided with a first substrate 101 and a second substrate 102, and a liquid crystal layer 103 interposed between the first and the second substrates 101 and 102. Each of the first and the second substrates 101 and 102 is configured of a transparent material such as glass, for example. The first and the second substrates 101 and 102 are disposed to oppose each other with a gap distance "d" in between.

As illustrated in FIGS. 21 and 22, a first transparent electrode 111 is uniformly formed on the first substrate 101 substantially entirely on a side opposing the second substrate 102, whereas second transparent electrodes 112 are partially formed on the second substrate 102 on a side opposing the first substrate 101. Each of the first and the second transparent electrodes 111 and 112 is configured of a transparent conductive film such as an ITO (Indium-Tin oxide) film. As illustrated in FIG. 22, each of the second transparent electrodes 112 has an electrode-width of a width "L", and extends in a vertical direction, for example. The second transparent electrodes 112 are arranged in parallel at an interval corresponding to a lens-pitch "p" (more specifically, the lens-pitch p at the time when the lens effect is generated). A spacing between the adjacent two second transparent electrodes 112 corresponds to an opening having a distance "A". Note that, for the sake of describing the arrangement of the second transparent electrodes 112, FIG. 22 illustrates a state where a positional relationship between the first and the second substrates 101 and 102 are reversed, i.e., the first substrate 101 is on an upper side and the second substrate 102 is on a lower side, as compared with FIG. 21.

An alignment film (not illustrated) is formed between the first transparent electrode 111 and the liquid crystal layer 103. The unillustrated alignment film is also formed between the second transparent electrodes 112 and the liquid crystal layer 103. The liquid crystal layer 103 includes liquid crystal molecules 104 having a refractive index anisotropy, which are distributed uniformly in accordance with a direction of orientation defined by the alignment films.

In this lens array element, the liquid crystal molecules 104 are aligned uniformly in a predetermined direction defined by the alignment films, in a normal state in which an applied voltage is at zero volts as illustrated in FIG. 20A. Accordingly, a wavefront 201 of light rays, having passed through the lens array element, is in a form of plane wave, and thus the lens array element has a state in which no lens effect is present. On the other hand, since the second transparent electrodes 112 in the lens array element are separately disposed to have the opening including the distance A as illustrated in FIGS. 21 and 22, deviation occurs in an electric field distribution within the liquid crystal layer 103 when a predetermined driving voltage is applied in the state illustrated in FIG. 21. More specifically, such an electric field is generated in which an electric field intensity is stronger in accordance with the driving voltage in a portion corresponding to regions in which the second transparent electrodes 112 are formed, and is weaker as a distance from the portion increases toward the center of the opening of the distance A. Accordingly, the alignment of the liquid crystal molecules 104 changes in accordance with the distribution of the electric field intensity, as illustrated in FIG. 20B. Thus, the wavefront 202 of the light rays having passed through the lens array element are changed, and the lens effect is generated.

Japanese Patent Application Unexamined Publication No. 2008-9370 discloses a liquid crystal lens in which a portion corresponding to the second transparent electrodes 112 in the electrode configuration illustrated in FIGS. 21 and 22 has a two-layer structure. In this liquid crystal lens, an interval of arrangement of the transparent electrodes, formed on one side of a liquid crystal layer, is changed in a first layer and in a second layer. Therefore, control of an electric field distribution formed in the liquid crystal layer is optimized more easily.

SUMMARY OF THE INVENTION

There is almost no influence such as polarization when a cylindrical lens array 302 is a fixed lens array formed with a resin such as an acrylic resin for realizing a stereoscopic displaying illustrated in FIG. 19. On the other hand, when the cylindrical lens array 302 is structured with a lens array element utilizing the liquid crystal lenses, there is a polarization property unique to the liquid crystal lenses.

For example, when assuming that an alignment film on a first substrate 101 and an alignment film on a second substrate 102 in a lens array element illustrated in FIGS. 20A and 20B are applied respectively with a rubbing process from mutually opposite directions and in parallel to each other to have a so-called antiparallel direction, each rod-like liquid crystal molecule 104 in a liquid crystal layer 103 is oriented in a predetermined orientation direction defined by the rubbing process as illustrated in FIG. 23A, in a state where a voltage is not applied. In FIG. 23A, a transverse direction of the drawing corresponds to the predetermined orientation direction defined by the rubbing process. On the other hand, in a state where the voltage is applied, each of the liquid crystal molecules 104 stands up along an electric field generated by the applied voltage, as illustrated in FIG. 23B.

In such a liquid crystal lens element, a lens effect is induced with respect to a polarization component which is along a long-axis direction of the liquid crystal molecule 104. Here, since the liquid crystal molecules 104 in the vicinity of the alignment films are aligned substantially in the predetermined orientation direction even in the state in which the voltage is applied, the long-axis direction of each of the liquid crystal molecules 104 is in a direction along the predetermined orientation direction, in the vicinity of the alignment films. Thus, the lens effect is generated for the polarization component along the predetermined orientation direction (the transverse direction in the drawing in an example illustrated in FIG. 23B). On the other hand, the lens effect is not induced for a polarization component which is perpendicular to the drawing (the polarization component orthogonal to the long-axis of the liquid crystal molecule 104), and thus light emitted from a light source passes through the liquid crystal lens element without being affected. Accordingly, when the light emitted from the light source and having no polarization enters the liquid crystal lens element described above, a component of light exit therefrom includes a superposition of a component condensed by the lens effect and a component having transmitted therethrough as it is.

In a two-dimensional display device such as a liquid crystal display, display-image light thereof is polarized in a particular direction. For example, the liquid crystal display has a configuration in which a body of the liquid crystal panel is so sandwiched by two polarizers that mutual polarization directions of the polarizers establish crossed nicols, and the display-image light is polarized into a direction defined by the polarization direction of the polarizer on the exit side. Thus, in a case where a stereoscopic display device is structured by combining the liquid crystal display with the liquid crystal lens array element, an efficient lens effect may not be obtained when the polarization property of the liquid crystal display and the polarization property of the liquid crystal lens array element are not considered, since both of them have their polarizing properties. When the efficient lens effect is not obtained, favorable visibility of three-dimensional displaying may not be acquired. For example, a plurality of parallaxes may not be separated sufficiently, and thus a stereoscopic image may be seen blurred or unclear. However, influence of the polarization property of the liquid crystal lens array element described above (i.e., a polarization direction in which the lens effect is generated as the liquid crystal lens) has not been considered in structuring the stereoscopic display device.

It is desirable to provide a stereoscopic display device capable of achieving an efficient lens effect in which a polarization property of a liquid crystal lens is considered, and thus performing three-dimensional displaying having good visibility.

A stereoscopic display device according to an embodiment (1) of the invention includes: a display panel having a display screen on which two-dimensional image is displayed, and configured to polarize image light of the image-displaying into a particular polarization direction; and a lens array element disposed to oppose the display screen of the display panel, and having a liquid crystal layer which includes liquid crystal molecules having a refractive index anisotropy and aligned in a predetermined orientation direction under no application of voltage, the lens array element being configured to electrically change the alignment of the liquid crystal molecules to generate a lens effect, and configured to selectively change a state of passing therethrough of the image light exiting from the display panel, wherein the predetermined orientation direction of the liquid crystal molecules of the lens array element and the polarization direction of the image light are parallel to each other.

In the stereoscopic display device according to the embodiment (1) of the invention, the predetermined orientation direction of the liquid crystal molecules in the lens array element and the polarization direction of the image light become parallel to each other. Thus, the efficient lens effect in which a polarization property of a liquid crystal lens is considered is achieved.

A stereoscopic display device according to an embodiment (2) of the invention includes: a display panel having a display screen on which two-dimensional image is displayed, and configured to polarize image light of the image-displaying into a particular polarization direction; a lens array element disposed to oppose the display screen of the display panel, and having a liquid crystal layer which includes liquid crystal molecules having a refractive index anisotropy and aligned in a predetermined orientation direction under no application of voltage, the lens array element being configured to electrically change the alignment of the liquid crystal molecules to generate a lens effect, and configured to selectively change a state of passing therethrough of the image light exiting from the display panel; and a phase plate disposed between the display panel and the lens array element, and allowing the polarization direction of the image light to be parallel to the predetermined orientation direction of the liquid crystal molecules.

In the stereoscopic display device according to the embodiment (2) of the invention, the image light is so polarized by the phase plate that the polarization direction of the image light becomes parallel with the predetermined orientation direction of the liquid crystal molecules of the lens array element. Thus, the efficient lens effect in which the polarization property of the liquid crystal lens is considered is achieved.

A stereoscopic display device according to an embodiment (3) of the invention includes: a display panel having a display screen on which two-dimensional image is displayed; a lens array element disposed to oppose the display screen of the display panel, and having a liquid crystal layer which includes liquid crystal molecules having a refractive index anisotropy and aligned in a predetermined orientation direction under no application of voltage, the lens array element being configured to electrically change the alignment of the liquid crystal molecules to generate a lens effect, and configured to selectively change a state of passing therethrough of image light exiting from the display panel; and a polarizer disposed between the display panel and the lens array element or disposed on a light-exiting side of the lens array element, and allowing only a light component, which is in a direction parallel to the predetermined orientation direction of the liquid crystal molecules, to pass therethrough.

In the stereoscopic display device according to the embodiment (3) of the invention, only the light component which is in the direction parallel with the predetermined orientation direction of the liquid crystal molecules of the lens array element eventually exits by the polarizer. Thus, the efficient lens effect in which the polarization property of the liquid crystal lens is considered is achieved.

According to the stereoscopic display device of the embodiment (1) of the invention, the predetermined orientation direction of the liquid crystal molecules of the lens array element and the polarization direction of the image light are parallel to each other. Thus, the efficient lens effect in which the polarization property of the liquid crystal lens is considered is obtainable. Therefore, it is possible to perform the three-dimensional displaying having good visibility.

According to the stereoscopic display device of the embodiment (2) of the invention, the polarization direction of the image light is caused to be parallel with the predetermined orientation direction of the liquid crystal molecules of the lens array element by the phase plate. Thus, the efficient lens effect in which the polarization property of the liquid crystal lens is considered is obtainable. Therefore, it is possible to perform the three-dimensional displaying having good visibility.

According to the stereoscopic display device of the embodiment (3) of the invention, only the light component which is in the direction parallel with the predetermined orientation direction of the liquid crystal molecules of the lens array element is caused to transmit by the polarizer. Thus, the efficient lens effect in which the polarization property of the liquid crystal lens is considered is obtainable. Therefore, it is possible to perform the three-dimensional displaying having good visibility.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION OF THE PREFERRED EMBODIMENTS

Hereinafter, some embodiments of the present invention will be described with reference to the accompanying drawings.

[First Embodiment]
[Overall Configuration of Stereoscopic Display Device]

Figure 1:
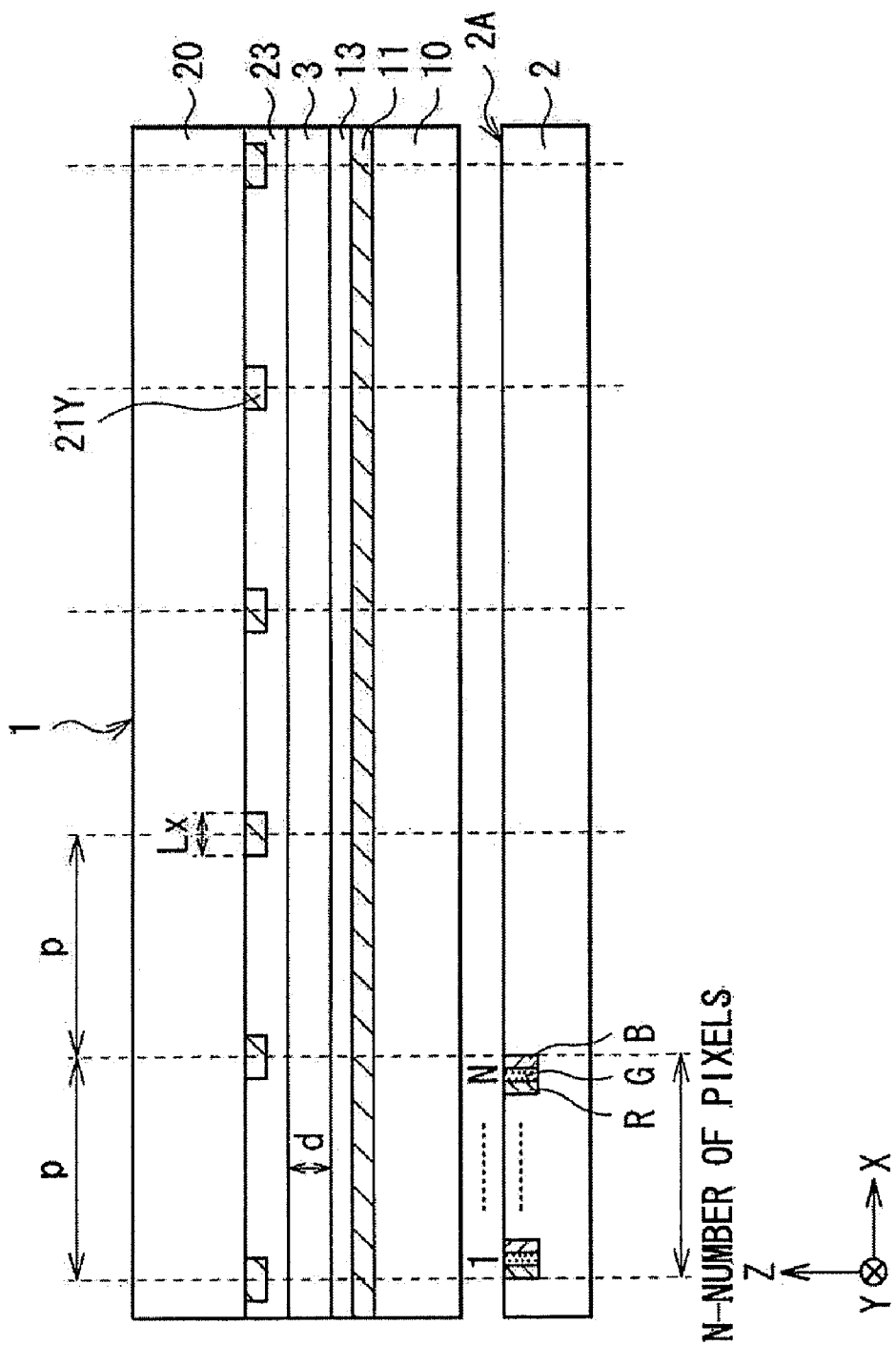
FIG. 1 is a cross-sectional view illustrating an example of an overall configuration of a stereoscopic display device according to a first embodiment of the invention.

FIG. 1 illustrates one example of a configuration of a stereoscopic display device according to a first embodiment of the invention. The stereoscopic display device is provided with a display panel 2 for performing image-displaying two-dimensionally, and a lens array element 1 disposed to oppose a display screen 2A of the display panel 2. The stereoscopic display device is configured to be capable of switching over between two displaying modes including a two-dimensional displaying mode and a three-dimensional displaying mode.

As will be described later in greater detail, the lens array element 1 is a variable lens array utilizing liquid crystal lenses, and is capable of performing ON and OFF control of a lens effect electrically. The lens array element 1 controls the lens effect according to the displaying mode, so as to selectively change a passing state of light rays from the display panel 2. The display panel 2 performs picture displaying based on two-dimensional image data when the two-dimensional displaying is to be performed, and performs picture displaying based on three-dimensional image data when the three-dimensional displaying is to be performed. As used herein, the "three-dimensional image data" refers, for example, to data including a plurality of parallax images corresponding to a plurality of viewing-angle directions in three-dimensional displaying. For example, when the binocular three-dimensional displaying is performed, the three-dimensional image data may be data of parallax images to be displayed for right eye and to be displayed for left eye.

In the present embodiment, the description is made based on the definition where a transverse direction (or a "horizontal direction") and a vertical direction (or a "perpendicular direction") in a plane parallel to each substrate plane in the lens array element 1 or to each substrate plane of the display panel 2, are "X-direction" and "Y-direction", respectively. Basically, the transverse direction of the display screen 2A of the display panel 2 is the X-direction, and the vertical direction of the display screen 2A is the Y-direction.

[Configuration of Display Panel 2]

The display panel 2 includes a plurality of pixels each having a pixel for red (R), a pixel for green (G), and a pixel for blue (B), and the plurality of pixels are arranged in a matrix pattern, for example. N-number of pixels (n is an integer equal to or more than 2) are arranged for a pitch "P" of cylindrical lenses formed by the lens array element 1. In the three-dimensional displaying mode, the number of light rays (the number of lines of sight) in the three-dimensional displaying corresponding to the N-number of pixels is presentable. For example, the display panel 2 can be structured with a liquid crystal display. When the display 2 is structured with a transmissive liquid crystal display, light emitted from a backlight is modulated for each pixel in accordance with image data, to perform two-dimensional displaying of the image, for example.

Figure 2A:
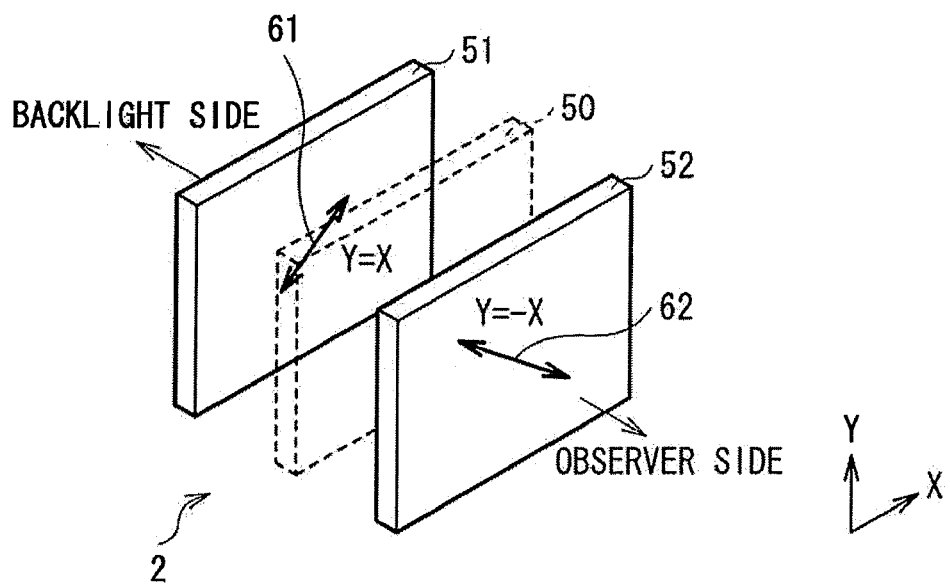
FIG. 2A illustrates a first arrangement example of a polarizer in a liquid crystal display panel.
Figure 2B:
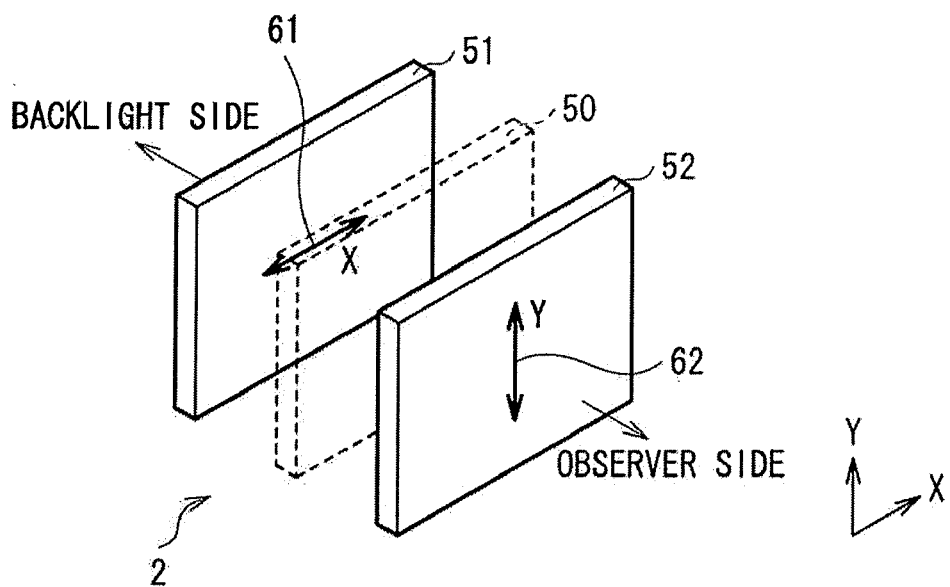
FIG. 2B illustrates a second arrangement example of the polarizer in the liquid crystal display panel.

FIGS. 2A and 2B illustrate configuration examples where the display panel 2 is structured with the transmissive liquid crystal display, respectively. In each of the configuration examples, the display panel 2 has a configuration in which a liquid crystal section (or a "panel body 50") is sandwiched by a first polarizer 51 and a second polarizer 52. The first polarizer 51 is disposed on the backlight side, and the second polarizer 52 is disposed on the observer side (the side on which the light is exit). The first polarizer 51 and the second polarizer 52 are so arranged that mutual polarization directions 61 and 62 thereof establish crossed nicols. When the first polarizer 51 and the second polarizer 52 are to be arranged in crossed nicols, an arrangement in which the polarization directions 61 and 62 thereof are mutually aligned obliquely in the plane parallel to the display screen 2A, and an arrangement in which the polarization directions 61 and 62 are mutually aligned in the transverse direction and the vertical direction respectively in the plane parallel to the display screen 2A, may be contemplated.

FIG. 2A illustrates an example of the arrangement where the mutual polarization directions 61 and 62 are aligned obliquely. In the configuration example of FIG. 2A, the first polarizer 51 and the second polarizer 52 are disposed to oppose each other, such that the first polarization direction 61 of the first polarizer 51 is in a first oblique direction (i.e., in an oblique direction at an angle of 45 degrees; Y=X-direction), and that the second polarization direction 62 of the second polarizer 52 is in a second oblique direction (i.e., in an oblique direction at an angle of minus 45 degrees; Y=minus X-direction).

FIG. 2B illustrates an example of the arrangement where the mutual polarization directions 61 and 62 are aligned in the transverse direction and in the vertical direction, respectively. In the configuration example of FIG. 2B, the first polarizer 51 and the second polarizer 52 are disposed to oppose each other, such that the first polarization direction 61 of the first polarizer 51 is in the transverse direction (i.e., X-direction), and that the second polarization direction 62 of the second polarizer 52 is in the vertical direction (i.e., Y-direction).

When the display panel 2 is configured with the liquid crystal display described above, the display-image light is polarized into a direction defined by the second polarization direction 62 of the second polarizer 52 located on the exit side. In the configuration example of FIG. 2A, the display-image light which is polarized in the oblique direction at the 45 degrees angle is exited. In the configuration example of FIG. 2B, the display-image light polarized in the vertical direction is exited.

[Overall Configuration of Lens Array Element 1]

As illustrated in FIG. 1, the lens array element 1 is provided with a first substrate 10 and a second substrate 20 which are disposed to oppose each other with a gap distance "d" in between, and a liquid crystal layer 3 arranged between the first substrate 10 and the second substrate 20. Each of the first substrate 10 and the second substrate 20 is a transparent substrate configured of a transparent material, which can be a glass material, a resin material, or other suitable material. A first electrode 11 is uniformly formed on the first substrate 10 substantially entirely on a side opposing the second substrate 20. A first alignment film 13 is also formed on the first substrate 10 through the first electrode 11, in such a manner as to contact with the liquid crystal layer 3. Second electrodes 21Y are partially formed on the second substrate 20 on a side opposing the first substrate 10. A second alignment film 23 is also formed on the second substrate 20 through the second electrodes 21Y, in such a manner as to contact with the liquid crystal layer 3. Each of the first electrode 11 and the second electrodes 21Y is configured of a transparent conductive film, which can be an ITO (Indium-Tin oxide) film, or other suitable material.

Figure 20A:
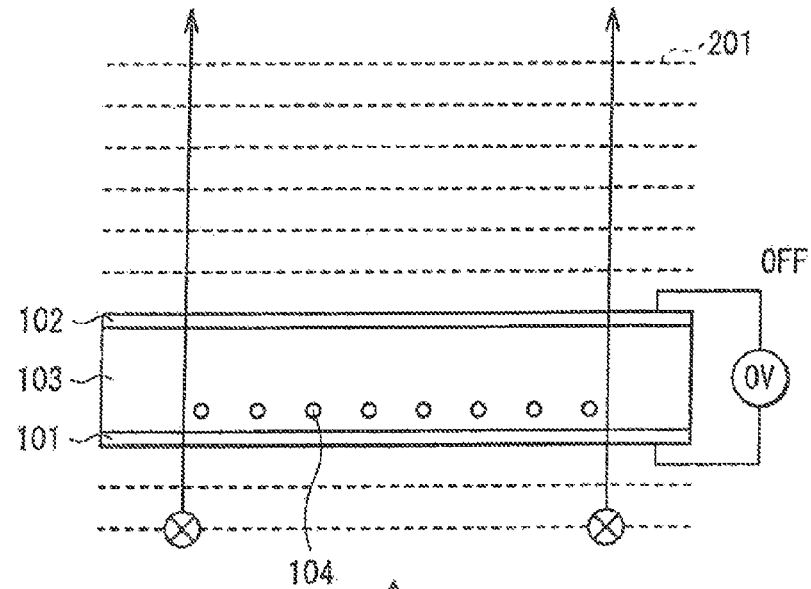
FIG. 20A is a cross-sectional view illustrating an example of a configuration of a switching lens array element utilizing liquid crystal lenses, in a state where no lens effect is present.
Figure 20B:
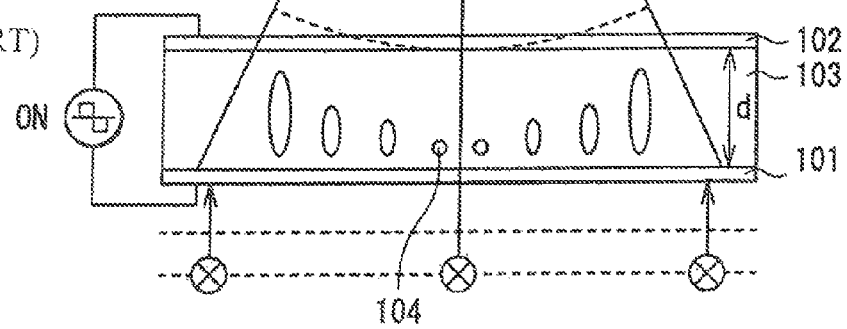
FIG. 20B is a cross-sectional view illustrating the example of the configuration of the switching lens array element utilizing the liquid crystal lenses, in a state where the lens effect is generated.
Figure 21:
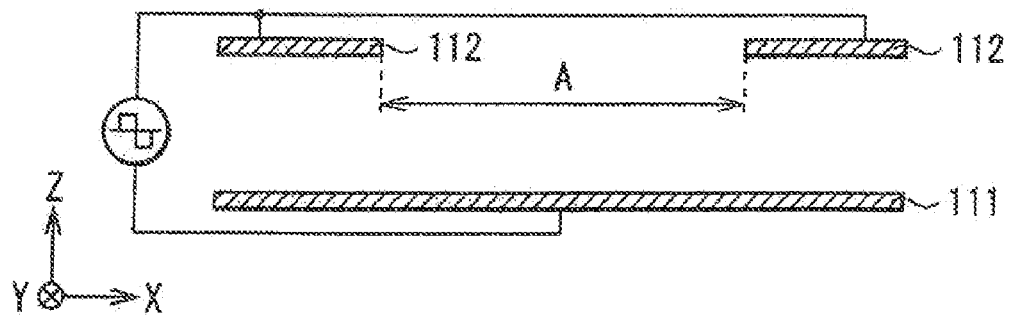
FIG. 21 is a cross-sectional view illustrating an example of a configuration of an electrode part in the liquid crystal lenses illustrated in FIGS. 20A and 20B.
Figure 22:
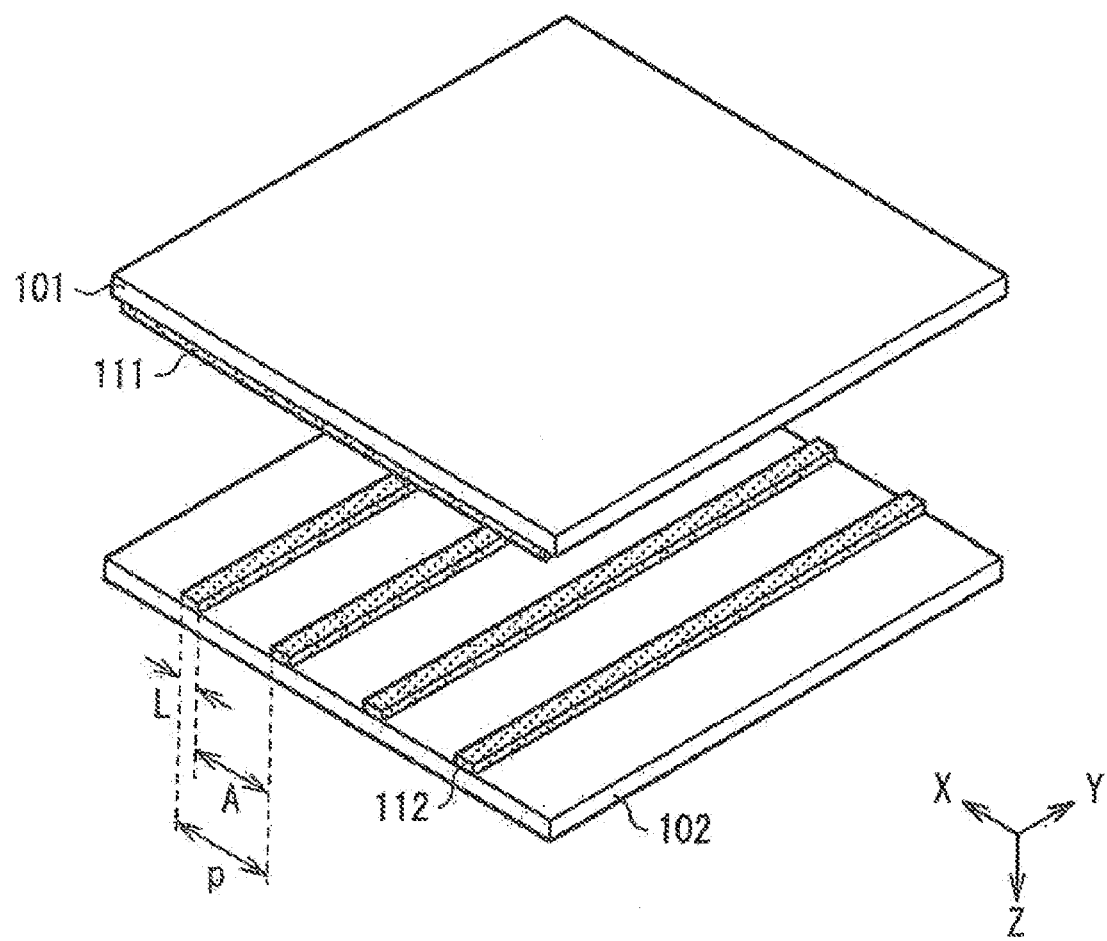
FIG. 22 is a perspective view illustrating an example of the configuration of the electrode part in the liquid crystal lenses illustrated in FIGS. 20A and 20B.
Figures 23A, 23B:
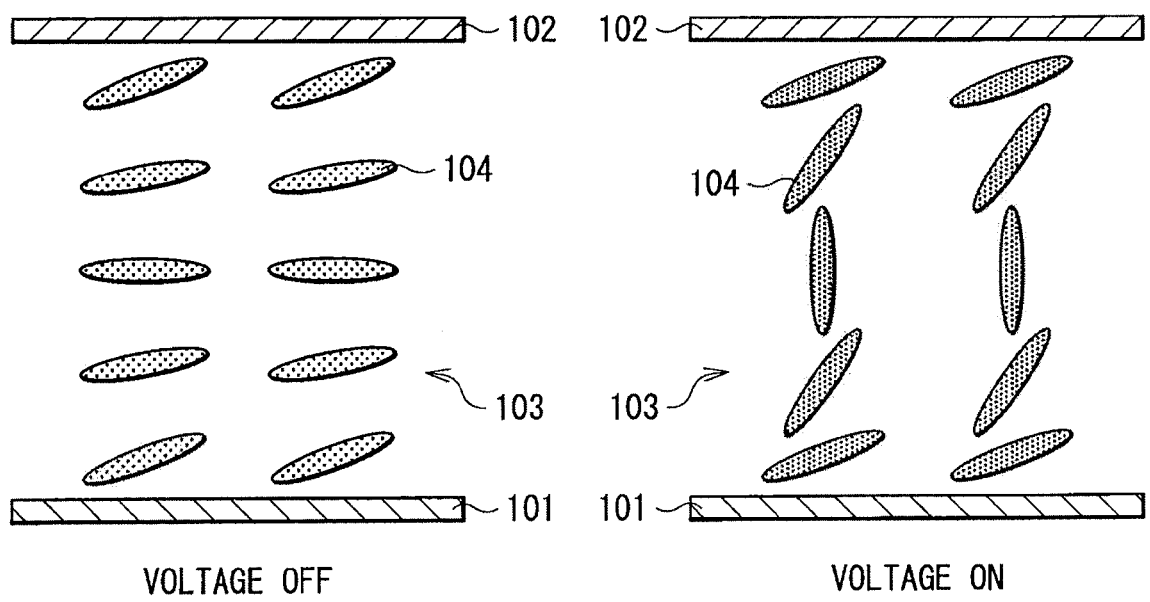
FIG. 23A illustrates an initial orientation state of liquid crystal molecules in the liquid crystal lenses.
FIG. 23B illustrates an orientation state of the liquid crystal molecules when a voltage is applied.

The liquid crystal layer 3 includes liquid crystal molecules 5. The lens effect is controlled by a change in a direction of alignment of the liquid crystal molecules 5 in accordance with a voltage applied to the first electrode 11 and the second electrodes 21Y. The liquid crystal molecule 5 has a refractive index anisotropy, and has a structure including a refractive index ellipsoid, in which a refractive index to the light rays passing therethrough is different for a longitudinal direction (or a "long-axis direction") and for a transverse direction perpendicular to the longitudinal direction (or a "short-axis direction") thereof. The liquid crystal layer 3 is configured to be electrically switched over between a state in which no lens effect is present and a state in which the lens effect is generated, in accordance with a state of the voltage applied to the first electrode 11 and the second electrodes 21Y. A basic principle of the generation of the lens effect is similar to that of the liquid crystal lenses illustrated in FIGS. 20A and 20B.

[Electrode Configuration of Lens Array Element 1]

Figure 3A:
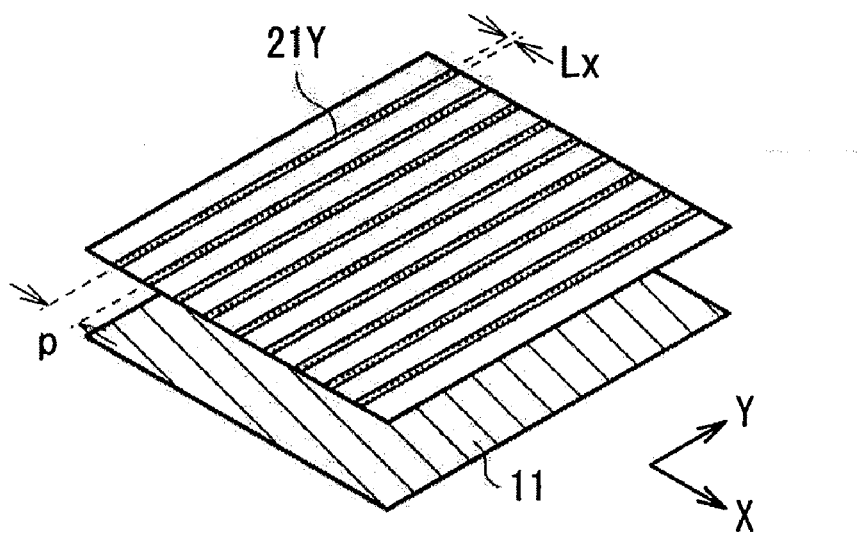
FIG. 3A is a perspective view illustrating an example of a configuration of an electrode part of a lens array element according to the first embodiment of the invention.
Figure 3B:
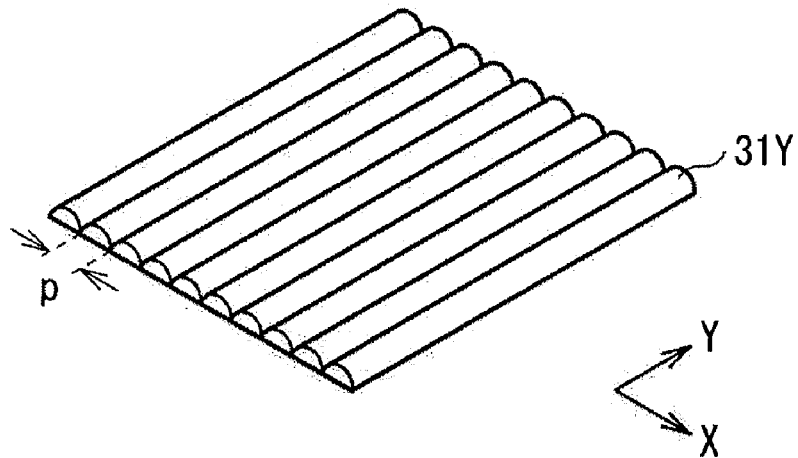
FIG. 3B is a perspective view illustrating, in an optically-equivalent manner, a shape of lenses in the lens array element according to the first embodiment of the invention.

FIG. 3A illustrates an example of a plan configuration of an electrode part of the lens array element 1. FIG. 3B illustrates, in an optically-equivalent manner, a shape of lenses in the electrode configuration illustrated in FIG. 3A. Each of the second electrodes 21Y has a width (Lx) and extends in the vertical direction. As illustrated in FIG. 3A, the second electrodes 21Y are arranged in parallel at an interval corresponding to a lens-pitch "p" (more specifically, the lens-pitch p at the time when the lens effect is generated). When the lens effect is to be generated, a predetermined potential difference, capable of generating the change in the alignment of the liquid crystal molecules 5, is caused to occur between the upper and the lower electrodes (the first electrode 11 and the second electrodes 21Y) sandwiching the liquid crystal layer 3. The first electrode 11 is formed substantially entirely, whereas the second electrodes 21Y are partially formed to have the interval in between in the transverse direction. Thus, when the predetermined driving voltage is applied to the second electrodes 21Y, deviation occurs in an electric field distribution within the liquid crystal layer 3, in accordance with the principle similar to that of the example illustrated in FIG. 20B. More specifically, such an electric field is generated, in which an electric field intensity is stronger in accordance with the driving voltage in a portion corresponding to regions in which the second electrodes 21Y are formed, and is weaker as a distance from the second electrodes 21Y increases in the transverse direction. In other words, the electric field distribution changes such that the lens effect is generated in the transverse direction (i.e., X-direction). That is, a state of lenses, in which plural cylindrical lenses 31Y extending in the Y-direction and having a refractive power in the X-direction are arranged in parallel, is obtained equivalently as illustrated in FIG. 3A.

[Orientation Direction of Liquid Crystal Molecules 5 in Lens Array Element 1]

Figure 4A:
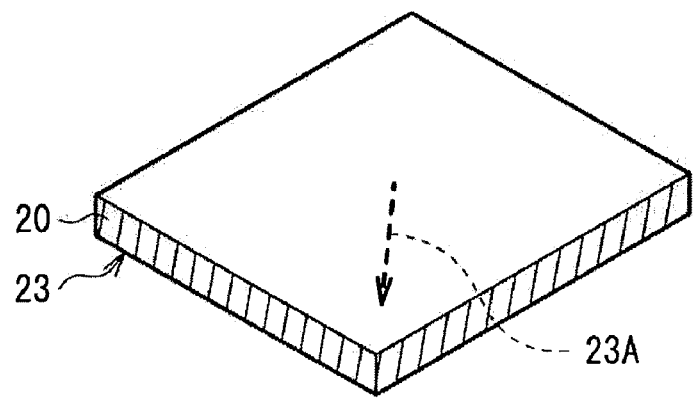
FIG. 4A illustrates a first arrangement example of alignment films in the lens array element according to the first embodiment of the invention.
Figure 4A:
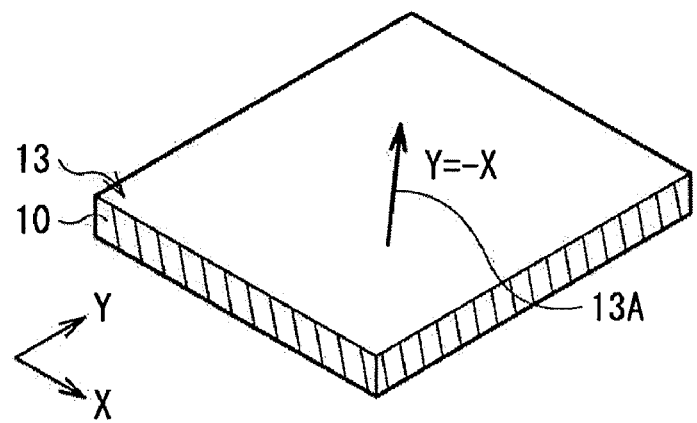
Figure 4B:
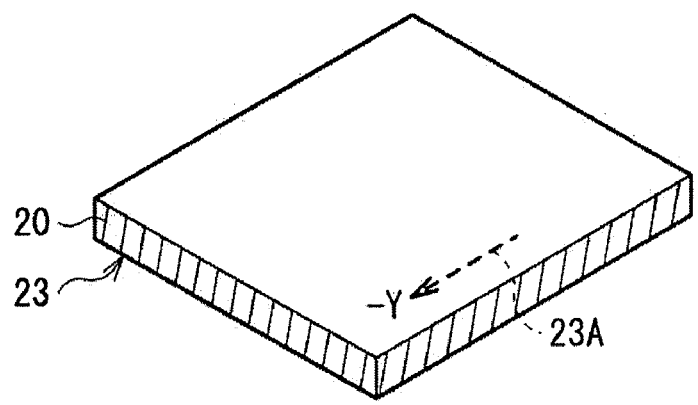
FIG. 4B illustrates a second arrangement example of the alignment films in the lens array element according to the first embodiment of the invention.
Figure 4B:
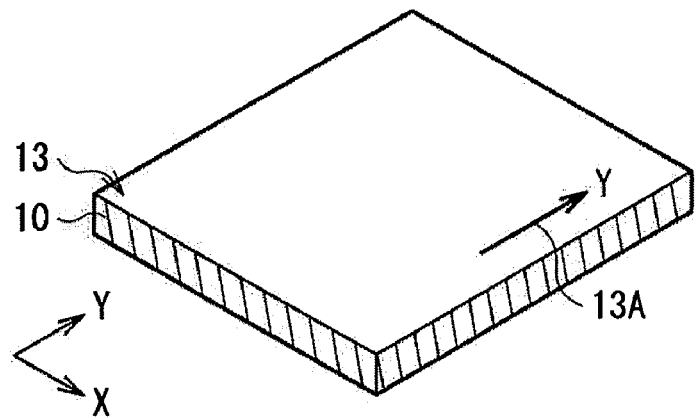

The first alignment film 13 on the first substrate 10 and the second alignment film 23 on the second substrate 20 in the lens array element 1 are applied respectively with a rubbing process from mutually opposite directions and in parallel to each other in the substrate planes, to have a so-called antiparallel direction. FIG. 4A illustrates an example where a first rubbing process direction 13A of the first alignment film 13 and a second rubbing process direction 23A of the second alignment film 23 are in the opposite directions to each other in the oblique direction at the minus 45 degrees angle (i.e., Y=minus X-direction) in the substrate planes. FIG. 4B illustrates an example where the first rubbing process direction 13A and the second rubbing process direction 23A are in the opposite directions to each other in the vertical direction (i.e., Y-direction) in the substrate planes. The rubbing process can be a method in which the alignment film including a high-molecular compound material is rubbed in one direction. The high-molecular compound material can be polyimide, or other suitable material.

Figure 5A:
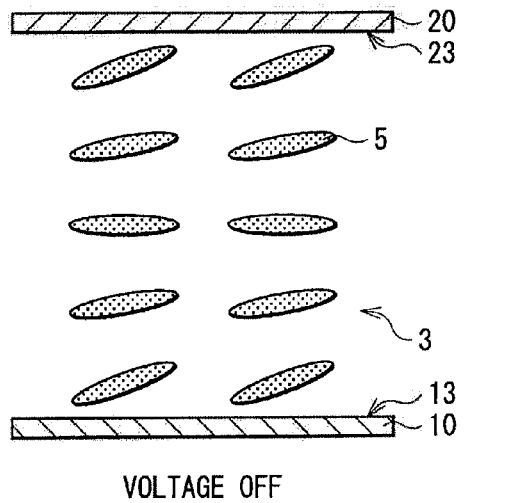
FIG. 5A illustrates an initial orientation state of liquid crystal molecules in the lens array element according to the first embodiment of the invention.
Figure 5B:
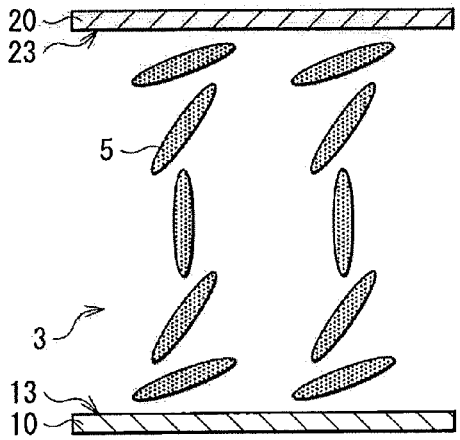
FIG. 5B illustrates an orientation state of the liquid crystal molecules when a voltage is applied.

As illustrated in FIG. 5A, the plural liquid crystal molecules 5 are aligned in a predetermined orientation direction within the liquid crystal layer 3 in the lens array element 1. The predetermined orientation direction is defined by the directions of the rubbing process in the first alignment film 13 and the second alignment film 23. As illustrated in FIG. 5A, each of the rod-like liquid crystal molecules 5 is oriented in the predetermined orientation direction defined by the rubbing process in the state where the voltage is not applied. On the other hand, in the state where the voltage is applied, each of the liquid crystal molecules 5 stands up along the electric field generated by the applied voltage, as illustrated in FIG. 5B. In the configuration illustrated in FIG. 4A, the liquid crystal molecules 5 are aligned in the oblique direction at the minus 45 degrees angle in the substrate planes, as the predetermined orientation direction. In the configuration illustrated in FIG. 4B, the liquid crystal molecules 5 are aligned in the Y-direction in the substrate planes, as the predetermined orientation direction. In the lens array element 1, the lens effect is generated for a polarization component which is along the predetermined orientation direction (the transverse direction in the drawing in the example illustrated in FIG. 5B).

[Relationship Between Polarization Direction of Display Panel 2 and Polarization Direction of Lens Array Element 1]

Figure 6:
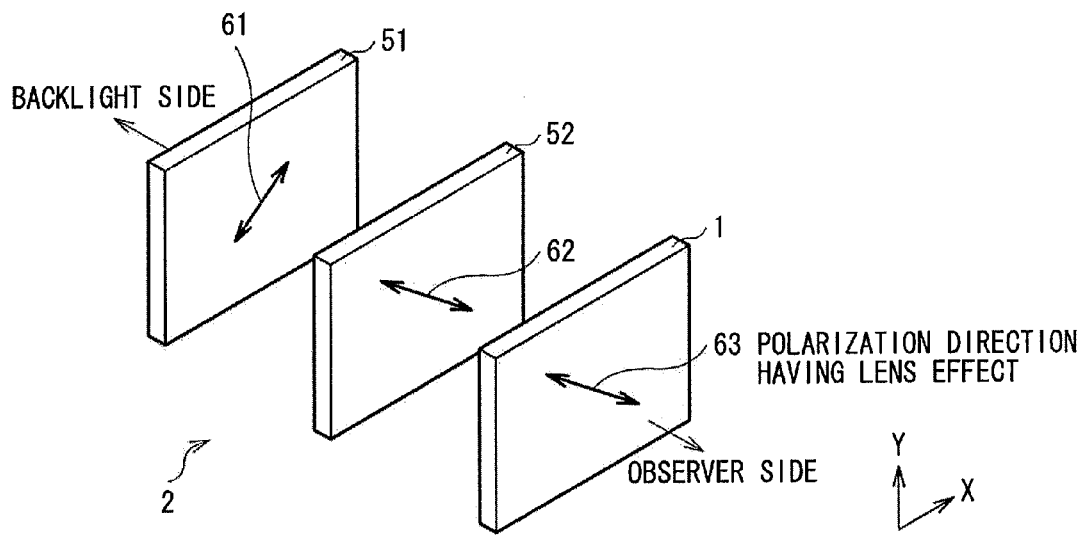
FIG. 6 is a perspective view illustrating a first configuration example of the stereoscopic display device according to the first embodiment of the invention.
Figure 7:
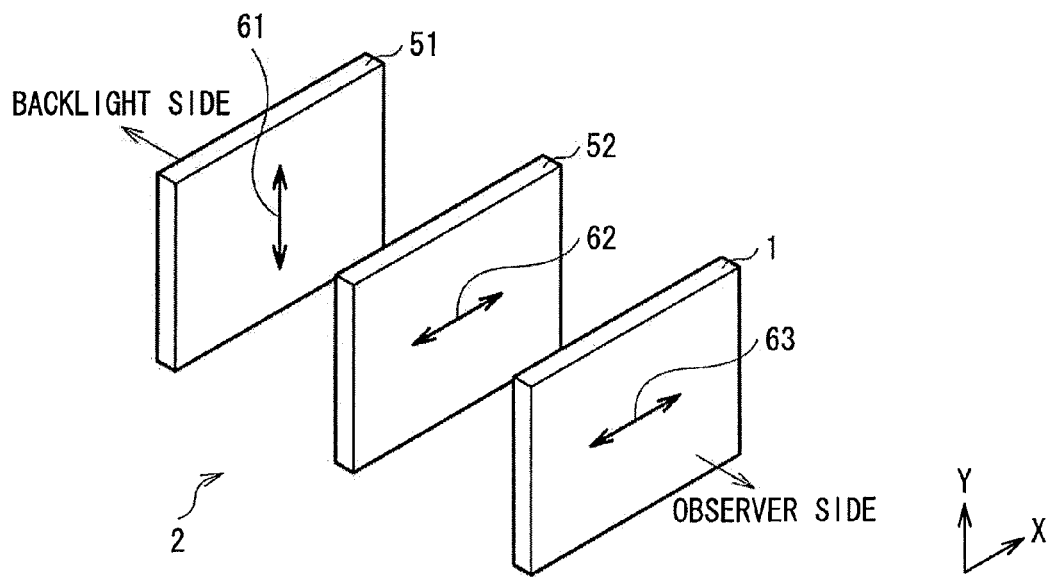
FIG. 7 is a perspective view illustrating a second configuration example of the stereoscopic display device according to the first embodiment of the invention.
Figure 8:
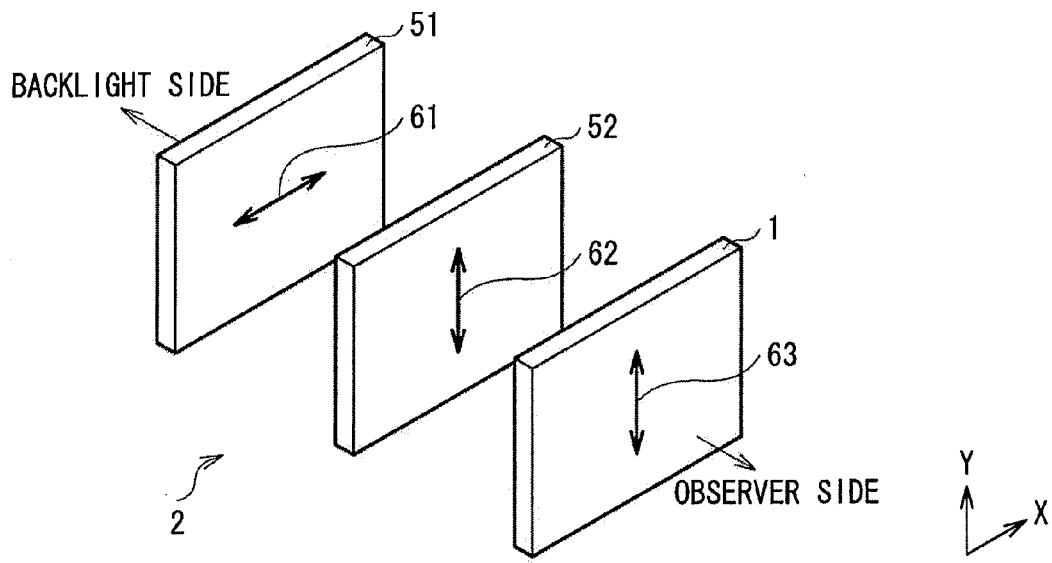
FIG. 8 is a perspective view illustrating a third configuration example of the stereoscopic display device according to the first embodiment of the invention.

As illustrated in FIGS. 6 to 8, the stereoscopic display device according to the present embodiment is so configured that a polarization direction 63 having the lens effect of the lens array element 1 and a polarization direction of the display-image light exiting from the display panel 2, are in parallel to each other. Here, the polarization direction having the lens effect is a direction which is the same as the predetermined orientation direction (i.e., directions of the rubbing process) of the liquid crystal molecules 5 as described above. The polarization direction of the display-image light exit from the display panel 2 is a direction defined by the second polarization direction 62 of the second polarizer 52 on the exit side.

In a first configuration example illustrated in FIG. 6, a configuration of the display panel 2 is similar to that illustrated in FIG. 2A, and the second polarization direction 62 of the second polarizer 52 is in the oblique direction at the minus 45 degrees angle. The polarization direction 63 having the lens effect of the lens array element 1 is also in the oblique direction at the minus 45 degrees angle, corresponding to the second polarization direction.

In a second configuration example illustrated in FIG. 7, the display panel 2 has a configuration, in which the first polarizer 51 and the second polarizer 52 are so disposed to oppose each other that the first polarization direction 61 of the first polarizer 51 is in the vertical direction (i.e., Y-direction) and the second polarization direction 62 of the second polarizer 52 is in the transverse direction (i.e., X-direction). The polarization direction 63 having the lens effect of the lens array element 1 is in the X-direction, corresponding to the second polarization direction 62.

In a third configuration example illustrated in FIG. 8, a configuration of the display panel 2 is similar to that illustrated in FIG. 2B, and the second polarization direction 62 of the second polarizer 52 is in the Y-direction. The polarization direction 63 having the lens effect of the lens array element 1 is also in the Y-direction, corresponding to the second polarization direction 62.

The configuration examples illustrated in FIGS. 6 to 8 are representative examples of the configuration where the polarization direction of the display panel 2 and the polarization direction of the lens array element 1 are caused to match with each other. However, alternative configurations for matching those two polarization directions with each other can be contemplated without departing from the scope of the claims appended hereto. The invention is therefore not limited by the configuration examples illustrated in the drawings.

[Operation of Stereoscopic Display Device]

The stereoscopic display device according to the present embodiment switches the lens array element 1 from the state in which no lens effect is present to the state in which the lens effect is generated or vice versa, to electrically switches over between the two-dimensional displaying and the three-dimensional displaying. More specifically, the lens array element 1 is caused to have the state in which no lens effect is present to allow the display-image light exiting from the display panel 2 to transmit the lens array element 1 without causing the display-image light to be deflected, so as to perform the two-dimensional displaying. Also, the lens array element 1 is caused to have the state in which the lens effect is generated to deflect the display-image light exiting from the display panel 2 in the X-direction, so as to perform the three-dimensional displaying by which a stereoscopic effect is obtained when both eyes of an observer are in the X-direction.

In particular, in the stereoscopic display device according to the present embodiment, the polarization direction of the display-image light exiting from the display panel 2 and the polarization direction 63 having the lens effect become parallel to each other as illustrated in FIGS. 6 to 8. Thus, the efficient lens effect in which the polarization property of the liquid crystal lens is considered is achieved. Thereby, the three-dimensional displaying having good visibility is performed.

[Evaluation of Displaying Quality of Stereoscopic Display Device]

Figure 9:
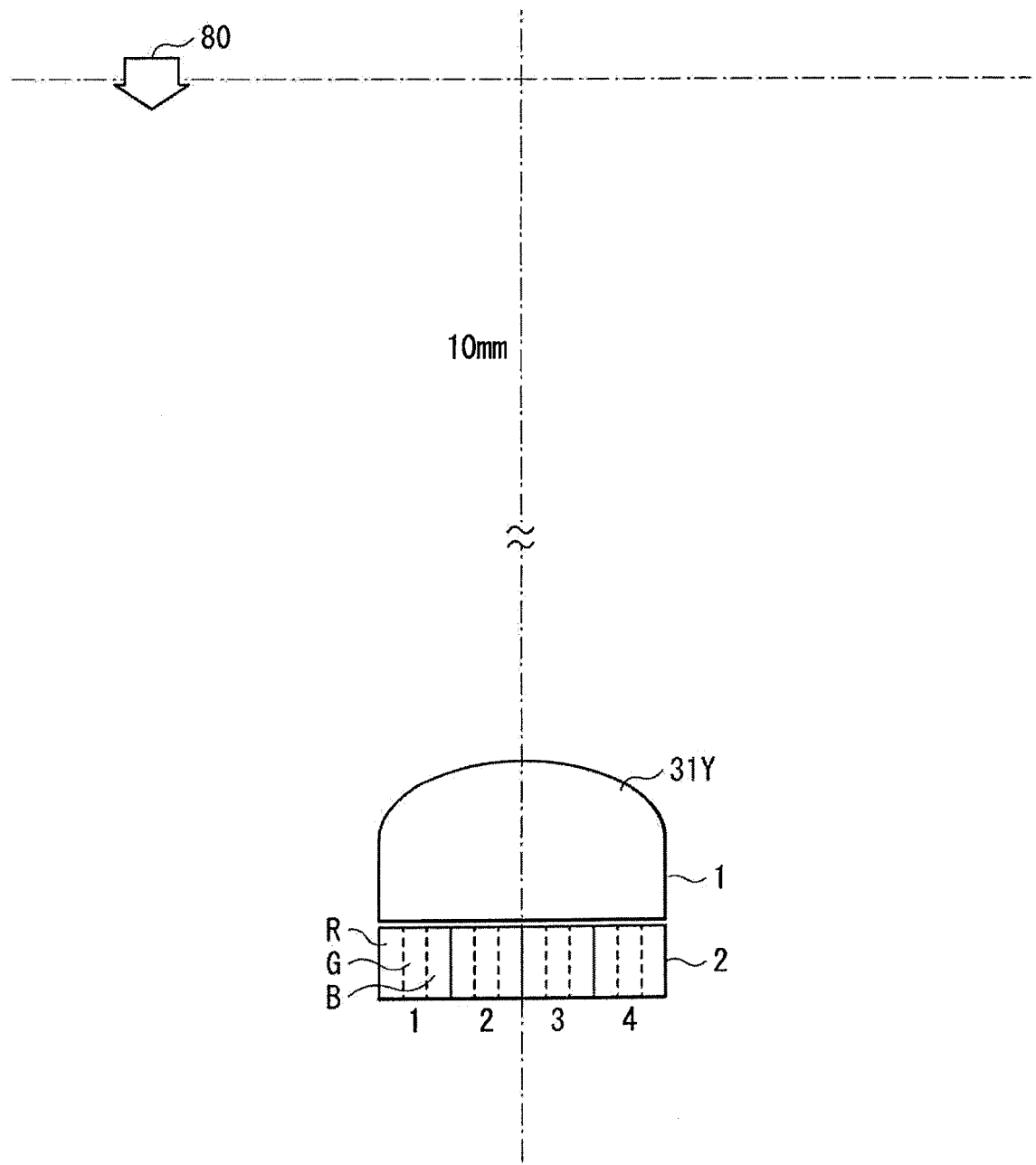
FIG. 9 is an explanatory view schematically illustrating a configuration of a measurement system used in evaluating a quality of displaying.

Evaluation of displaying quality of the stereoscopic display device according to the present embodiment was conducted for each of the configuration examples illustrated in FIGS. 6 to 8. FIG. 9 schematically illustrates a measurement system used in evaluating the quality of displaying thereof. As illustrated in FIG. 9, a configuration was employed in which four pixels of the display panel 2 were arranged for a lens width of the cylindrical lens 31Y formed by the cylindrical lens array 1. Each of the pixels of the display panel 2 includes three sub-pixels having a red (R) sub-pixel, a green (G) sub-pixel, and a blue (B) sub-pixel. A photodiode 80 capable of observing a light intensity and moving in parallel to the display panel 2, was disposed at a position 10 mm away from the stereoscopic display device having the configuration described before, to provide the measurement system. The light intensity in accordance with a direction of movement of the photodiode 80 was measured under the condition in which each of the four pixels was caused to display only green color.

Figure 10:
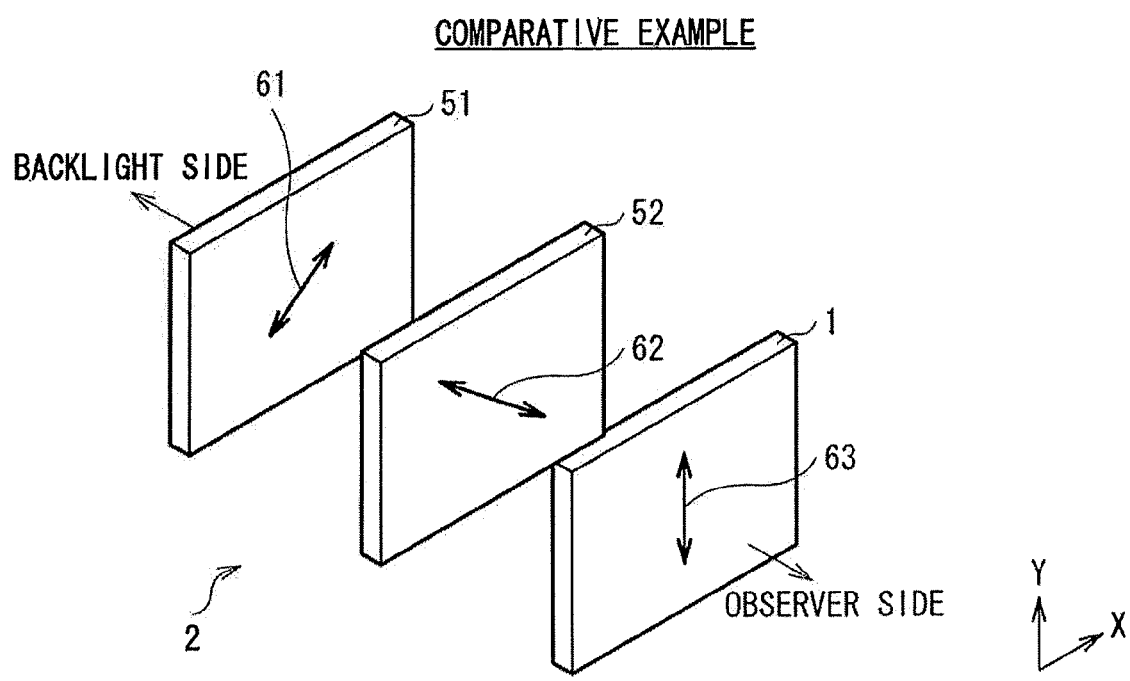
FIG. 10 is a perspective view illustrating a configuration of a stereoscopic display device according to a comparative example.

For comparison purpose, a measurement was also conducted for a configuration according to a comparative example illustrated in FIG. 10. The comparative example illustrated in FIG. 10 is a representative example of a configuration in which the polarization direction 63 having the lens effect of the lens array element 1 and the polarization direction of the display-image light, exit from the display panel 2, are not matched with each other. In the comparative example illustrated in FIG. 10, the configuration of the display panel 2 was similar to that illustrated in FIG. 2A, and the second polarization direction 62 of the second polarizer 52 was in the oblique direction at the minus 45 degrees angle. The polarization direction 63 having the lens effect of the lens array element 1 was caused not to match with the second polarization direction 62, and was in the Y-direction.

Figure 11:
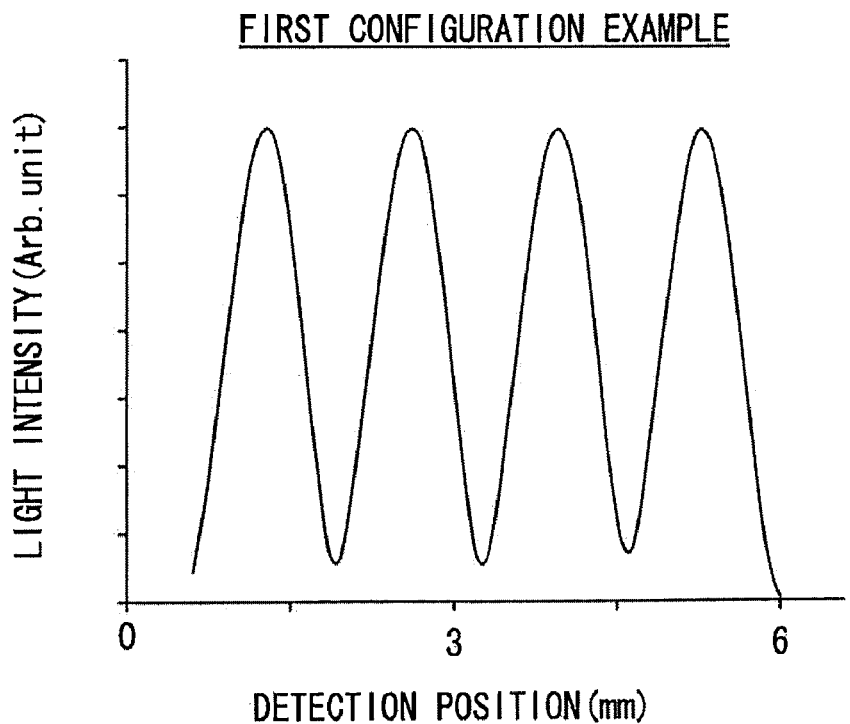
FIG. 11 is a characteristic diagram representing a light intensity distribution in the first configuration example of the stereoscopic display device according to the first embodiment of the invention.
Figure 12:
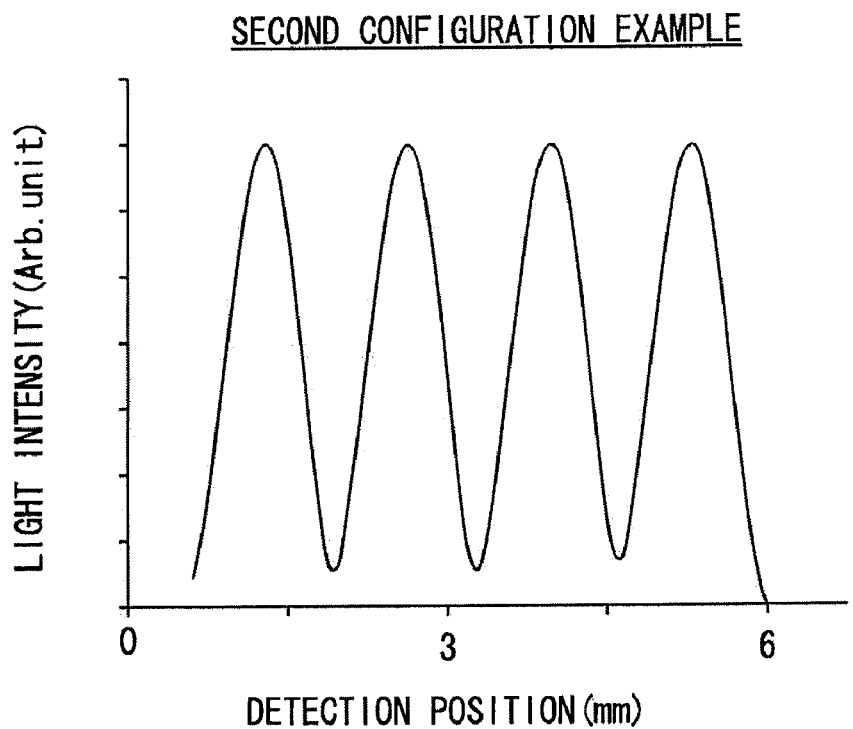
FIG. 12 is a characteristic diagram representing the light intensity distribution in the second configuration example of the stereoscopic display device according to the first embodiment of the invention.
Figure 13:
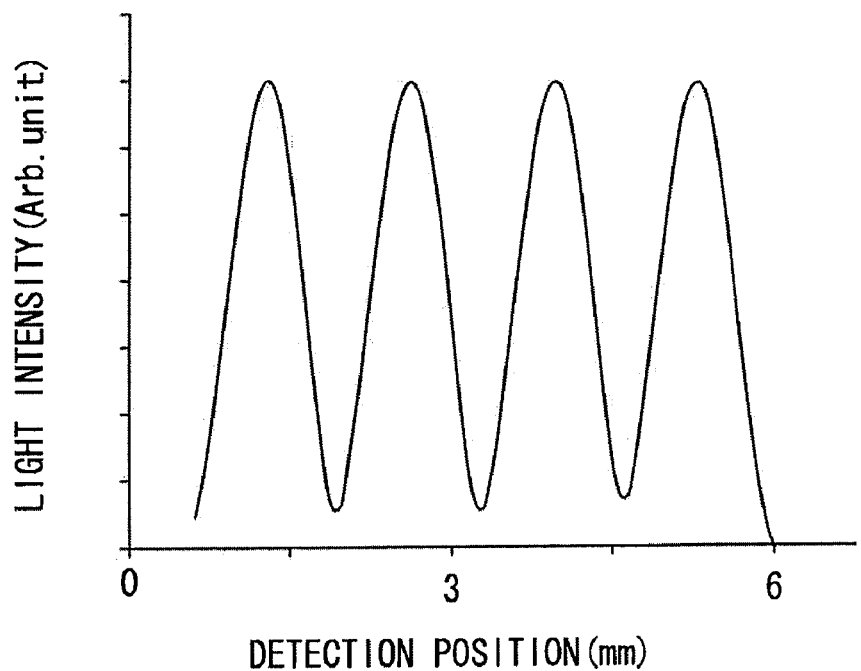
FIG. 13 is a characteristic diagram representing the light intensity distribution in the third configuration example of the stereoscopic display device according to the first embodiment of the invention.
Figure 14:
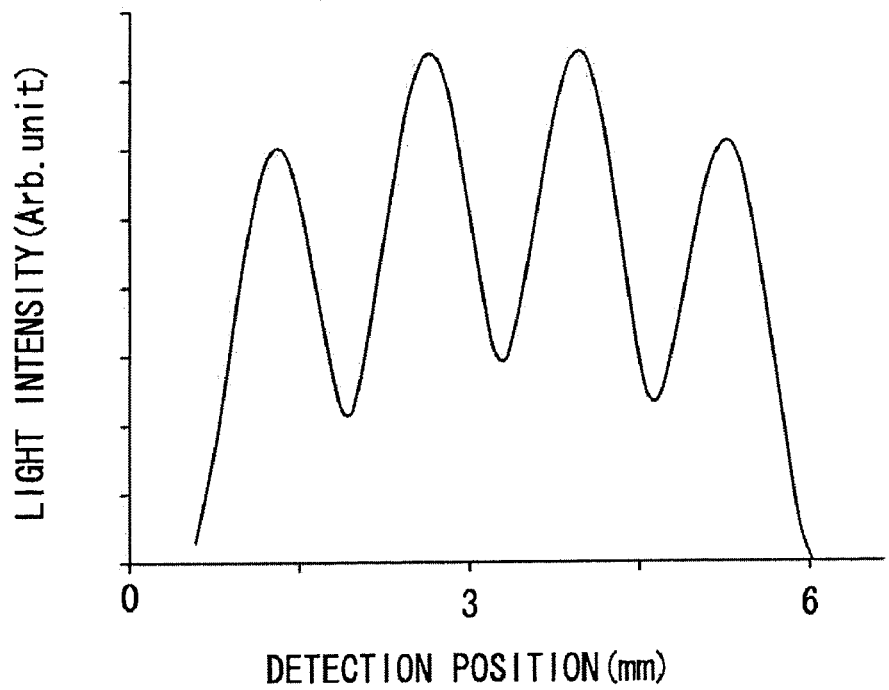
FIG. 14 is a characteristic diagram representing the light intensity distribution in the stereoscopic display device according to the comparative example.

FIGS. 11 to 13 represent results of the measurement of light intensity distribution for the configuration examples illustrated in FIGS. 6 to 8, respectively. FIG. 14 represents a result of measurement of light intensity distribution for the comparative example illustrated in FIG. 10. In each of FIGS. 11 to 14, a horizontal axis indicates a position of detection (in mm) of the light intensity by the photodiode 80, while a vertical axis indicates the light intensity (in arbitrary units). It is to be noted that there are four positions where the light intensity is at its highest or at its "peak". This is due to the respective lights emitted from the four pixels illustrated in FIG. 9 are imaged at different positions respectively by the cylindrical lens 31Y, and the four positions having the peak light intensity here correspond to positions of lines of sight in performing the stereoscopic displaying.

As can be seen from FIG. 14, although the peak of intensity corresponding to the number of lines of sight was observed in the four positions in the configuration according to the comparative example, the four positions were observed in a state in which an offset component other than a peak component of the intensity was generally overlapped with the peak component. With such a light intensity distribution, an image is consequently recognized by the observer as blurred or unclear in perception of the stereoscopic displaying. This overall offset component is considered due to an influence of the polarization component having no lens effect in the lens array element 1.

In contrast, as can be seen from FIGS. 11 to 13, measurement results which were similar to one another were obtained for the configuration examples illustrated in FIGS. 6 to 8, respectively. In each of the configuration examples, not only the peak of intensity corresponding to the number of lines of sight was observed in the four positions, but also a "mountain" of each of the intensity peaks was extremely sharp (which means that a contrast is excellent), as well as the overlapping between the adjacent peak components was extremely little. Such a light intensity distribution is considered due to the fact that the polarization direction of the display-image light exiting from the display panel 2 and the polarization direction 63 having the lens effect, are in parallel to each other, and thus there is substantially no influence caused by the polarization component having no lens effect. With this light intensity distribution, sufficient separation of parallaxes is possible, and thus an excellent stereoscopic image is recognized by the observer in perception of the stereoscopic displaying.

As described in the foregoing, according to the stereoscopic display device of the present embodiment of the invention, the predetermined orientation direction of the liquid crystal molecules 5 in the lens array element 1 and the polarization direction of the display-image light are configured to be parallel to each other. Thus, the efficient lens effect in which the polarization property of the liquid crystal lens is considered is obtainable. Therefore, it is possible to perform the three-dimensional displaying having good visibility.

[Second Embodiment]

Now, a second embodiment of the invention will be described. Note that the same or equivalent elements as those of the first embodiment described above are denoted with the same reference numerals, and will not be described in detail.

In the first embodiment described above, the polarization direction of the display-image light exit from the display panel 2 and the polarization direction 63 having the lens effect of the lens array element 1 are configured to be parallel to each other. The present embodiment provides an improvement in a case where the polarization direction of the display-image light and the polarization direction 63 having the lens effect do not match with each other. It is to be noted that, in a stereoscopic display device according to the present embodiment, only a relationship between the polarization direction of the display panel 2 and the polarization direction of the lens array element 1 differs from the first embodiment described above, and the basic configurations of the display panel 2 and the lens array element 1 alone are similar to those of the first embodiment.

Figure 15:
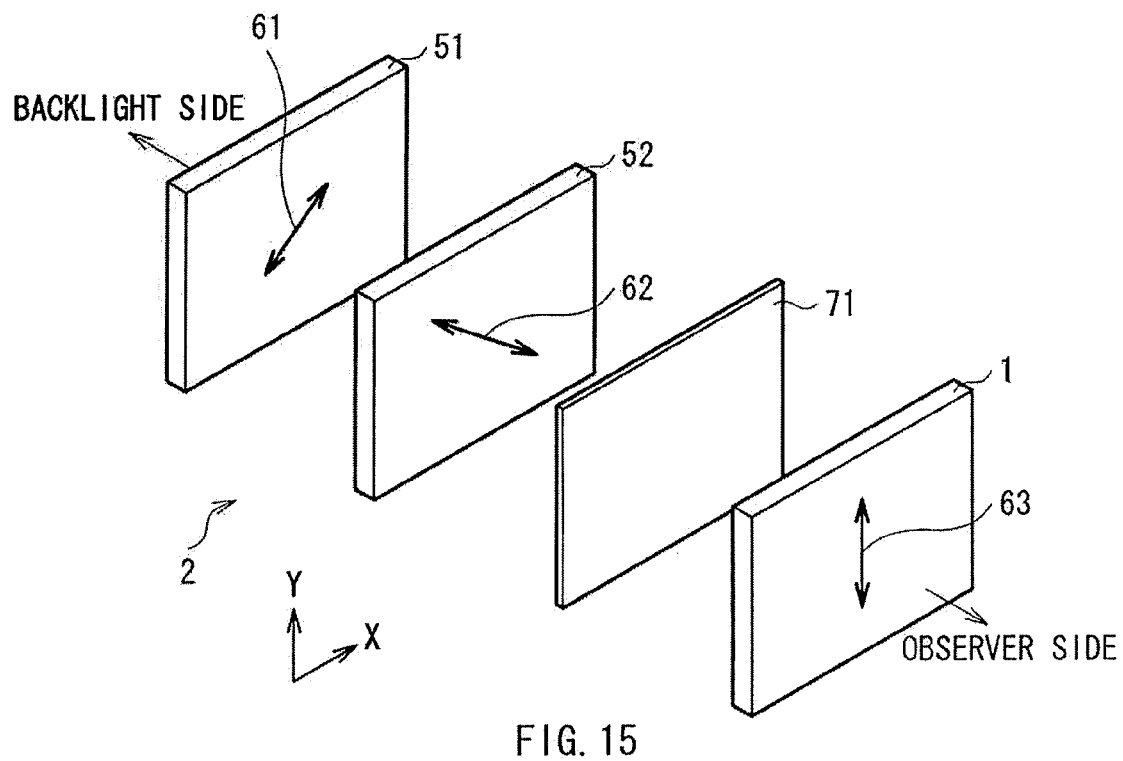
FIG. 15 is a perspective view illustrating an example of a configuration of a stereoscopic display device according to a second embodiment of the invention.

As illustrated in FIG. 15, the stereoscopic display device according to the present embodiment is configured such that the polarization direction 63 having the lens effect of the lens array element 1 and the polarization direction (i.e., the polarization direction 62 of the second polarizer 52) of the display-image light exit from the display panel 2 are different from each other. In addition thereto, a wavelength phase plate 71 is disposed between the display panel 2 and the lens array element 1. In a configuration example illustrated in FIG. 15, the configuration of the display panel 2 is similar to that illustrated in FIG. 2A, and the second polarization direction 62 of the second polarizer 52 is in the oblique direction at the minus 45 degrees angle. The polarization direction 63 having the lens effect of the lens array element 1 does not match with the second polarization direction 62, and is in the Y-direction.

The configuration example illustrated in FIG. 15 is one representative example of the configuration where the polarization direction of the display panel 2 and the polarization direction of the lens array element 1 do not matched with each other. However, alternative configurations in which those two polarization directions do not match with each other can be contemplated without departing from the scope of the claims appended hereto. The invention is therefore not limited by the configuration example illustrated in the drawings.

The wavelength phase plate 71 causes the polarization direction of the display-image light exiting from the display panel 2 to be parallel to the predetermined orientation direction (i.e., the polarization direction 63 having the lens effect) of the liquid crystal molecules 5 of the lens array element 1. The wavelength phase plate 71 brings, to the display-image light, a phase difference which corresponds to an angle difference between the second polarization direction 62 of the second polarizer 52 and the polarization direction 63 having the lens effect. For example, a phase difference of 218 may be provided in the configuration example illustrated in FIG. 15.

Figure 16:
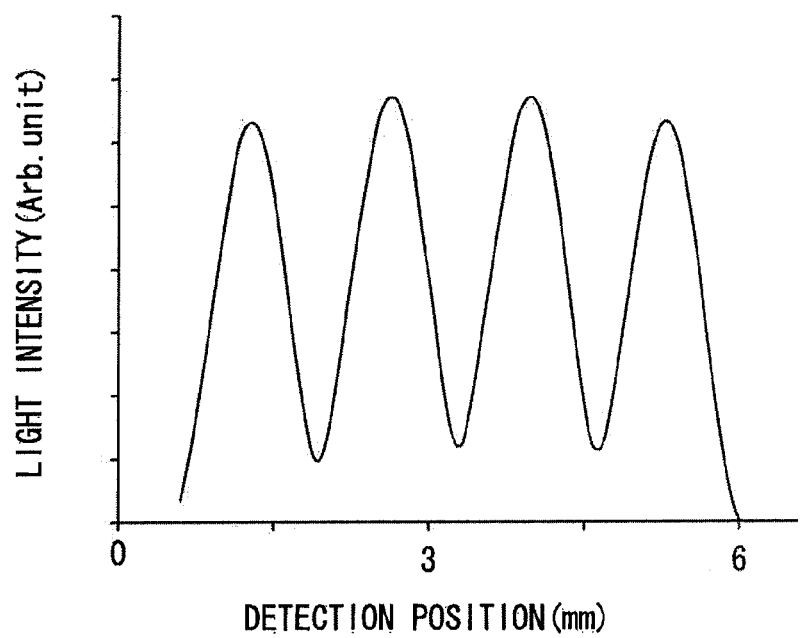
FIG. 16 is a characteristic diagram representing a light intensity distribution in the stereoscopic display device according to the second embodiment of the invention.

Evaluation of displaying quality of the stereoscopic display device illustrated in FIG. 15 was conducted with a measurement system which was similar to that of the first embodiment (see FIG. 9) described above. FIG. 16 illustrates a result of measurement of light intensity distribution thereof. As can be seen from FIG. 16, there was generally less offset component and the four peak components were well separated from one another in the configuration example illustrated in FIG. 15, as compared with the result of measurement (see FIG. 14) of the configuration according to the comparative example (see FIG. 10). Also, a "mountain" of each of the intensity peaks was sharp (which means that a contrast is excellent), and the overlapping between the adjacent peak components was little. Such a light intensity distribution is considered due to the fact that the polarization direction of the display-image light exit from the display panel 2 is consequently caused to be parallel with the polarization direction 63 having the lens effect by the effect of the wavelength phase plate 71, and thus the influence caused by the polarization component having no lens effect is substantially eliminated. With this light intensity distribution, sufficient separation of parallaxes is possible, and thus an excellent stereoscopic image is recognized by the observer in perception of the stereoscopic displaying.

According to the stereoscopic display device of the second embodiment of the invention, the efficient lens effect in which the polarization property of the liquid crystal lens is considered is obtainable by the effect of the wavelength phase plate 71. Therefore, it is possible to perform the three-dimensional displaying having good visibility.

[Third Embodiment]

Now, a third embodiment of the invention will be described. Note that the same or equivalent elements as those of the first embodiment described above are denoted with the same reference numerals, and will not be described in detail.

In the first embodiment described above, the polarization direction of the display-image light exit from the display panel 2 and the polarization direction 63 having the lens effect of the lens array element 1 are configured to be parallel to each other. The present embodiment provides an improvement in a case where the polarization direction of the display-image light and the polarization direction 63 having the lens effect do not match with each other. It is to be noted that, in a stereoscopic display device according to the present embodiment, only a relationship between the polarization direction of the display panel 2 and the polarization direction of the lens array element 1 differs from the first embodiment described above, and the basic configurations of the display panel 2 and the lens array element 1 alone are similar to those of the first embodiment.

Figure 17:
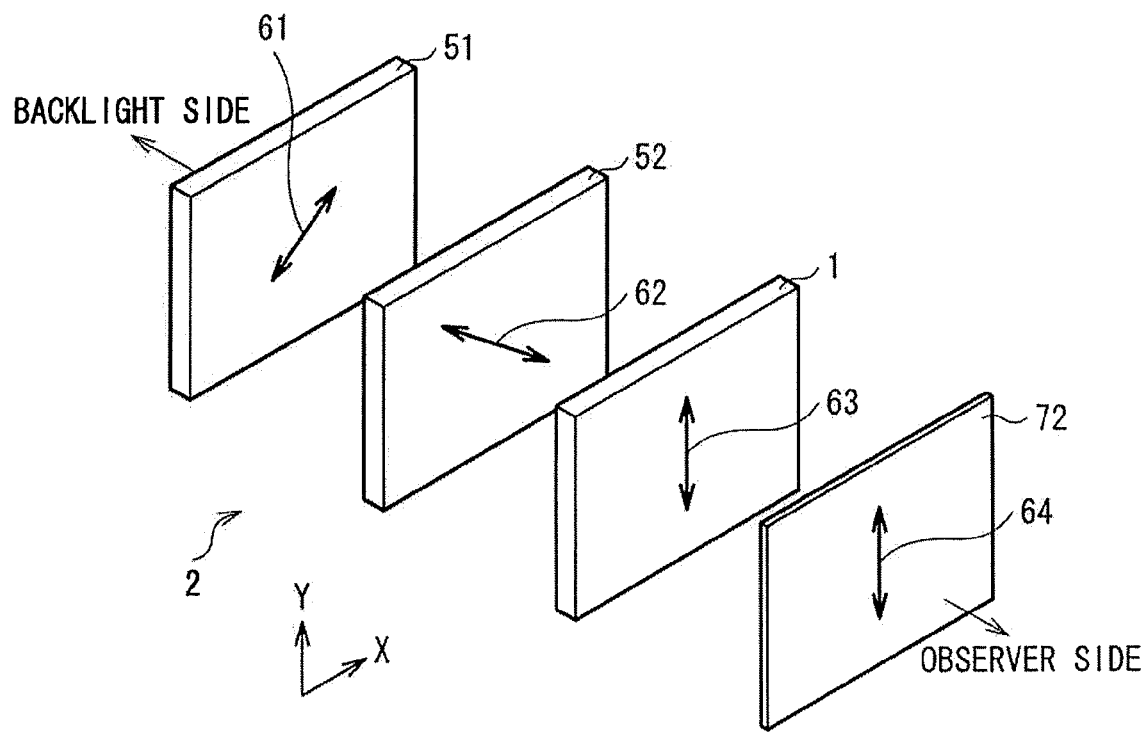
FIG. 17 is a perspective view illustrating an example of a configuration of a stereoscopic display device according to a third embodiment of the invention.

As illustrated in FIG. 17, the stereoscopic display device according to the present embodiment is configured such that the polarization direction 63 having the lens effect of the lens array element 1 and the polarization direction (i.e., the polarization direction 62 of the second polarizer 52) of the display-image light exit from the display panel 2 are different from each other. In addition thereto, a polarizer 72 is disposed on a light-exit side of the lens array element 1. In a configuration example illustrated in FIG. 17, the configuration of the display panel 2 is similar to that illustrated in FIG. 2A, and the second polarization direction 62 of the second polarizer 52 is in the oblique direction at the minus 45 degrees angle. The polarization direction 63 having the lens effect of the lens array element 1 does not match with the second polarization direction 62, and is in the Y-direction.

The configuration example illustrated in FIG. 17 is one representative example of the configuration where the polarization direction of the display panel 2 and the polarization direction of the lens array element 1 do not matched with each other. However, alternative configurations in which those two polarization directions do not match with each other can be contemplated without departing from the scope of the claims appended hereto. The invention is therefore not limited by the configuration example illustrated in the drawings. Also, the polarizer 72 may be alternatively disposed between the display panel 2 and the lens array element 1, instead of arranging the polarizer 72 on the light-exit side of the lens array element 1.

The polarizer 72 allows only a light component, which is in a direction parallel to the predetermined orientation direction (i.e., the polarization direction 63 having the lens effect) of the liquid crystal molecules 5 of the lens array element 1, to transmit therethrough. A polarization direction 64 of the polarizer 72 is in parallel with the polarization direction 63 having the lens effect of the lens array element 1. In the configuration example illustrated in FIG. 17, the polarization direction 63 is in the Y-direction.

Figure 18:
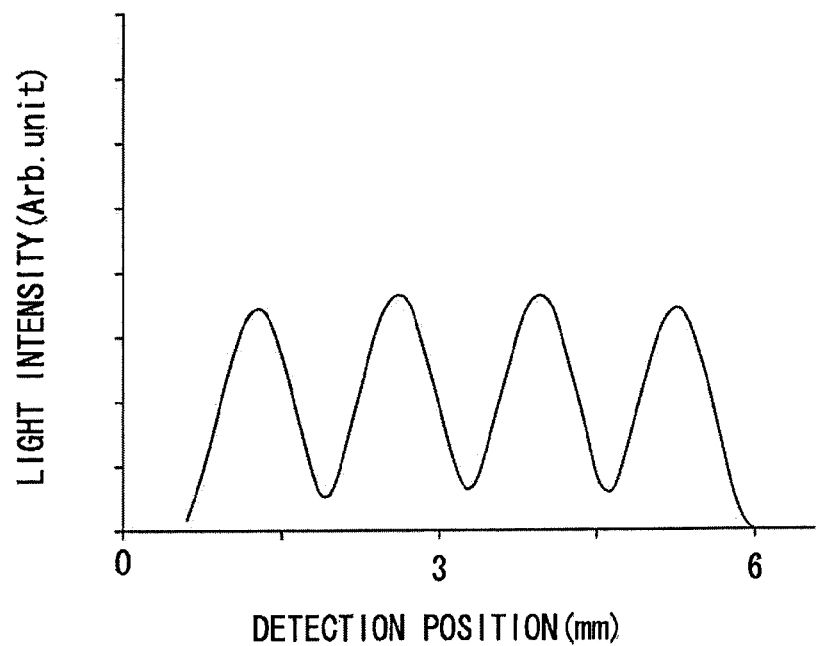
FIG. 18 is a characteristic diagram representing a light intensity distribution in the stereoscopic display device according to the third embodiment of the invention.
Figure 19:
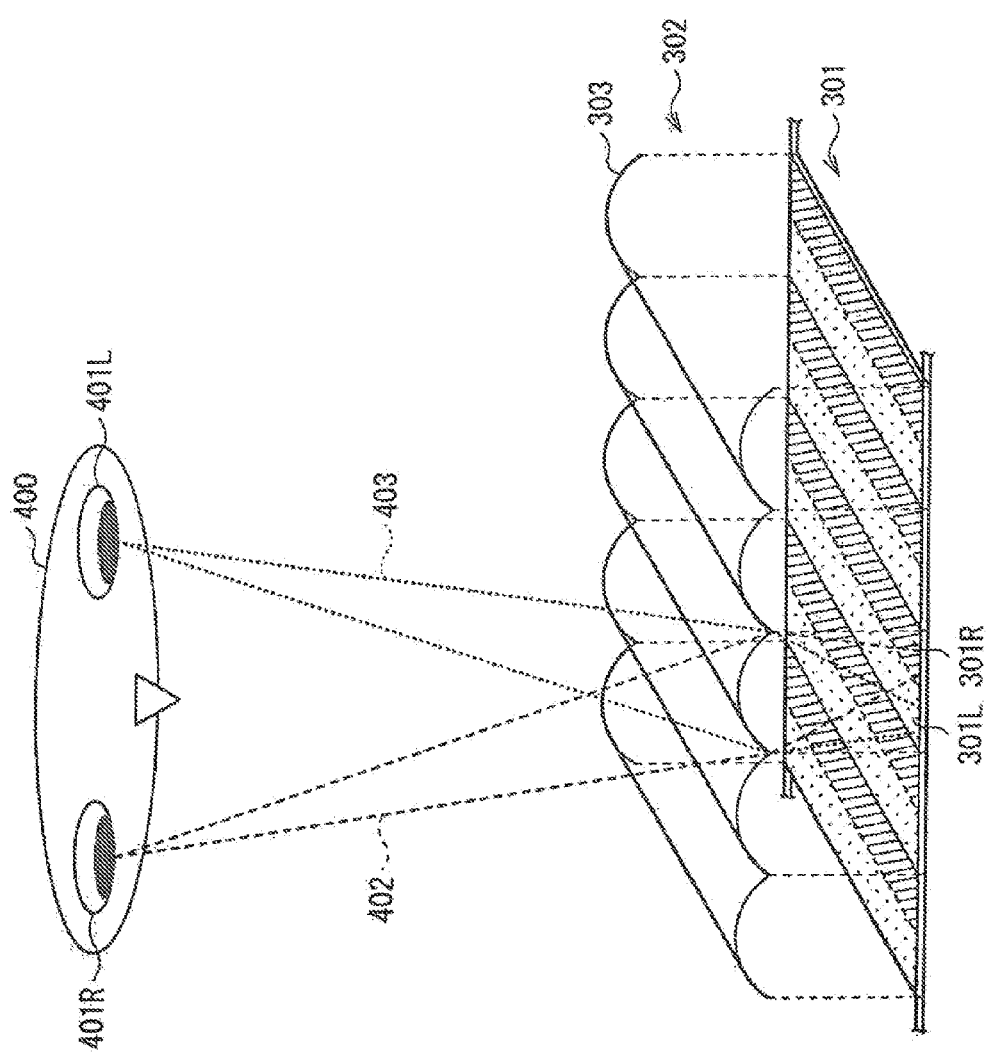
FIG. 19 is an explanatory view illustrating a concept of stereoscopic displaying utilizing cylindrical lenses.

Evaluation of displaying quality of the stereoscopic display device illustrated in FIG. 17 was conducted with a measurement system which was similar to that of the first embodiment (see FIG. 9) described above. FIG. 18 illustrates a result of measurement of light intensity distribution thereof. As can be seen from FIG. 18, there was generally less offset component and the four peak components were well separated from one another in the configuration example illustrated in FIG. 17, as compared with the result of measurement (see FIG. 14) of the configuration according to the comparative example (see FIG. 10). Also, a "mountain" of each of the intensity peaks was sharp (which means that a contrast is excellent), and the overlapping between the adjacent peak components was little. Such a light intensity distribution is considered due to the fact that the component of the light, exit eventually from the lens array element 1, is consequently caused to have only the component in the polarization direction 63 having the lens effect by the effect of the polarizer 72, and thus the influence caused by the polarization component having no lens effect is substantially eliminated. On the other hand, the intensity peak of the light component obtained eventually was about half of that of the measurement result according to the comparative example (see FIG. 14). Thus, although generally dark displaying is obtained, sufficient separation of parallaxes is possible, and thereby an excellent stereoscopic image is recognized by the observer in perception of the stereoscopic displaying.

According to the stereoscopic display device of the third embodiment of the invention, the efficient lens effect in which the polarization property of the liquid crystal lens is considered is obtainable by the effect of the polarizer 72. Therefore, it is possible to perform the three-dimensional displaying having good visibility.

It is to be noted that the stereoscopic display device according to the third embodiment of the invention is also effective in a case where a display other than the liquid crystal display is used for the display panel 2. For example, the stereoscopic display device is effective in a case where a spontaneous light-emitting display having no polarization property is used. The spontaneous light-emitting display can be an organic electro-luminescence (EL) display, a field-emission display (FED), or other suitable spontaneous light-emitting display.

[Alternative Embodiments]

Although the present invention has been described in the foregoing by way of example with reference to the embodiments, the present invention is not limited thereto but may be variously modified. For example, in each of the embodiments described above, the lens array element 1 generates the lens effect having the cylindrical lens-like configuration. However, the lens array element 1 may generate a lens effect having other configuration. The present invention is widely applicable to any case where the lens array element, in which the lens effect having the polarization property is generated, is used.

The present application contains subject matter related to that disclosed in Japanese Priority Patent Application JP 2009-058132 filed in the Japan Patent Office on Mar. 11, 2009, the entire content of which is hereby incorporated by reference.

Although the present invention has been described in terms of exemplary embodiments, it is not limited thereto. It should be appreciated that variations may be made in the described embodiments by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in the present disclosure is intended to be dedicated to the public regardless of whether the element or component is explicitly recited in the following claims.

What is claimed is:

1. A stereoscopic display device comprising:
   a display panel having a display screen on which two-dimensional image is display, and configured to polarize image light of the image-displaying into a particular polarization direction; and
   a lens array element disposed to oppose the display screen of the display panel, and having a liquid crystal layer which includes liquid crystal molecules having a refractive index anisotropy and aligned in a predetermined orientation direction under no application of voltage, the lens array element being configured to electrically change the alignment of the liquid crystal molecules to generate a lens effect, and configured to selectively change a state of passing therethrough of the image light exiting from the display panel, wherein the lens array element includes;

a first substrate and a second substrate which are disposed to oppose each other and sandwiching the liquid crystal layer therebetween;

a first alignment film provided on the first substrate on a side contacting, the liquid crystal layer, and applied with a rubbing process in a first direction; and a second alignment film provided on the second substrate on a side contacting the liquid crystal layer, and applied with a rubbing process in a second direction which is antiparallel to the first direction, and wherein the predetermined orientation direction of the liquid crystal molecules is defined by the first direction and the second direction in the rubbing processes to the first alignment film and the second alignment film, and the first direction and the second direction in the rubbing processes to the first alignment film and the second alignment film are parallel to the polarization direction of the image light.

2. The stereoscopic display device according to claim 1, wherein the display panel includes a liquid crystal display panel having a polarizer on a light-exiting side thereof, and the predetermined orientation direction of the liquid crystal molecules and a polarization direction of the polarizer are parallel to each other.

3. A stereoscopic display device comprising:

a display panel having a display screen on which two-dimensional image is displayed, and configured to polarize image light of the image-displaying into a particular polarization direction;

a lens array element disposed to oppose the display screen of the display panel, and having a liquid crystal layer which includes liquid crystal molecules having a refractive index anisotropy and aligned in a predetermined orientation direction under no application of voltage, the lens array elements being configured to electrically change the alignment of the liquid crystal molecules to generate a lens effect, and configured to selectively change a state of passing therethrough of the image light exiting from the display panel; and a phase plate disposed between the display panel and the lens array elements, wherein the lens array element includes:

first substrate and a second substrate which are disposed to oppose each other and sandwiching the liquid crystal layer therebetween;

a first alignment film provided on the first substrate on a side contacting the liquid crystal layer, and applied with a rubbing process in a first direction; and a second alignment film provided on the second substrate on a side contacting the liquid crystal layer, and applied with a rubbing process in a second direction which is antiparallel to the first direction, and wherein the predetermined orientation direction of the liquid crystal molecules is defined by the first direction and the second direction in the rubbing processes to the first alignment film and the second alignment film, and the phase plate brings, to the image light, a phase difference which allows the polarization direction of the image light to be parallel to the first direction and the second direction in the rubbing processes to the first alignment film and the second alignment film.

4. The stereoscopic display device according to claim 3, wherein the display panel includes a liquid crystal display panel having a polarizer on a light-exiting side thereof, the predetermined orientation direction of the liquid crystal molecules and a polarization direction of the polarizer are different from each other, and the phase plate brings, to the image light, a phase difference which corresponds to an angle difference between the polarization direction of the polarizer and the predetermined orientation direction of the liquid crystal molecules.

5. A stereoscopic display device comprising:

a display panel having a display screen on which two-dimensional image is displayed;

a lens array element disposed to oppose the display screen of the display panel, and having a liquid crystal layer which includes liquid crystal molecules having a refractive index anisotropy and aligned in a predetermined orientation direction under no application of voltage, the lens array element being configured to electrically change the alignment of the liquid crystal molecules to generate a lens effect, and configured to selectively change a state of passing therethrough of image light exiting from the display panel; wherein the lens array element includes:

a first substrate and a second substrate which are disposed to oppose each other and sandwiching the liquid crystal layer therebetween;

a first alignment film provided on the first substrate on a side contacting the liquid crystal layer, and applied with a rubbing process in a first direction; and a second alignment film provided on the second substrate on a side contacting the liquid crystal layer, and applied with a rubbing process in a second direction which is antiparallel to the first direction, and wherein the predetermined orientation direction of the liquid crystal molecules is defined by the first direction and the second direction in the rubbing processes to the first alignment film and the second alignment film, and a polarizer disposed between the display panel and the lens array element or disposed on a light-exiting side of the lens array element, wherein the polarizer allows only the light component, which is in a direction parallel to the first direction and the second direction in the rubbing processes to the first alignment film and the second alignment film, to pass therethrough.

6. The stereoscopic display device according to claim 1, wherein the lens array element is configured to be electrically switched over between a non-lens mode without a lens effect and a lens mode with a lens effect, the lens mode allowing a lens effect, which is to be obtained in arranging a plurality of cylindrical lenses in parallel, to be produced, and wherein the lens array element is set to the non-lens mode to allow the image light exiting from the display panel to pass therethrough without being deflected, to perform two-dimensional displaying, and the lens array element is set to the lens mode to allow the image light exiting from the display panel to pass therethrough with being deflected in a predetermined direction due to an effect equivalent to that of the plurality of cylindrical lenses, to perform three-dimensional displaying which allows stereoscopic effect along the predetermined direction to be achieved.

7. The stereoscopic display device according to claim 3, wherein the lens array element is configured to be electrically switched over between a non-lens mode without a lens effect and a lens mode with a lens effect, the lens mode allowing a lens effect, which is to be obtained in arranging a plurality of cylindrical lenses in parallel, to be produced, and wherein the lens array element is set to the non-lens mode to allow the image light exiting from the display panel to pass therethrough without being deflected, to perform two-dimensional displaying, and the lens array element is set to the lens mode to allow the image light exiting from the display panel to pass therethrough with being deflected in a predetermined direction due to an effect equivalent to that of the plurality of cylindrical lenses, to perform three-dimensional displaying which allows stereoscopic effect along the predetermined, direction to be achieved.

8. The stereoscopic display device according to claim 5, wherein the lens array element is configured to be electrically switched over between a non-lens mode without a lens effect and a lens mode with a lens effect, the lens mode allowing a lens effect, which is to be obtained in arranging a plurality of cylindrical lenses in parallel, to be produced, and wherein the lens array element is set to the non-lens mode to allow the image light exiting from the display panel to pass therethrough without being deflected, to perform two-dimensional displaying, and the lens array element is set to the lens mode to allow the image light exiting from the display panel to pass therethrough with being deflected in a predetermined direction due to an effect equivalent to that of the plurality of cylindrical lenses, to perform three-dimensional displaying which allows stereoscopic effect along the predetermined direction to be achieved.

\* \* \* \* \*